US008880673B2

(12) United States Patent
Ito et al.

(10) Patent No.: US 8,880,673 B2
(45) Date of Patent: Nov. 4, 2014

(54) APPLICATION PROVIDING SYSTEM, APPLICATION PROVIDING METHOD, AND INFORMATION PROCESSING APPARATUS

(75) Inventors: Hidenobu Ito, Kawasaki (JP); Kazuaki Nimura, Kawasaki (JP); Yousuke Nakamura, Kawasaki (JP); Kouichi Yasaki, Kawasaki (JP); Zhaogong Guo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 269 days.

(21) Appl. No.: 13/402,241

(22) Filed: Feb. 22, 2012

(65) Prior Publication Data
US 2012/0254411 A1    Oct. 4, 2012

(30) Foreign Application Priority Data

Mar. 30, 2011  (JP) .................................. 2011-076758
Jun. 3, 2011   (JP) .................................. 2011-125750

(51) Int. Cl.
G06F 15/173   (2006.01)
H04L 29/08    (2006.01)

(52) U.S. Cl.
CPC ............ *H04L 67/26* (2013.01); *H04L 67/2847* (2013.01); *H04L 67/34* (2013.01)
USPC ......................................... 709/223; 709/224

(58) Field of Classification Search
CPC ....... H04L 67/025; H04L 67/26; H04L 67/34; H04L 67/2847
USPC ......................................... 709/223–224, 248
See application file for complete search history.

(56) References Cited

U.S. PATENT DOCUMENTS

| 7,600,021 | B2 | 10/2009 | Schottland et al. |
| 7,814,234 | B2 | 10/2010 | Hawkins et al. |
| 2003/0066065 | A1 | 4/2003 | Larkin |
| 2004/0237082 | A1 | 11/2004 | Alcazar et al. |
| 2008/0201453 | A1 | 8/2008 | Assenmacher |
| 2009/0248695 | A1 | 10/2009 | Ozzie et al. |

FOREIGN PATENT DOCUMENTS

| EP | 1853044 | 11/2007 |
| JP | 2003-308210 | 10/2003 |

(Continued)

OTHER PUBLICATIONS

"European Search Report" mailed by EPO and corresponding to European application No. 12156981.8 on Aug. 28, 2013.

(Continued)

*Primary Examiner* — Philip B Tran
(74) *Attorney, Agent, or Firm* — Fujitsu Patent Center

(57) ABSTRACT

An application providing system has a communication terminal, a Web server that manages resources of Web applications, and a push server that manages storage location addresses of resources. The push server has an address managing unit that manages a terminal ID, a storage location address, and providing timing in a manner associated with one another. The push server further has a timing monitoring unit that monitors the providing timing. The push server further has a push transmitting unit that transmits a storage location address of a resource of a Web application associated with providing timing to a communication terminal associated with the providing timing upon detection of the providing timing to cache the resource of the Web application corresponding to the providing timing in the communication terminal.

5 Claims, 17 Drawing Sheets

(56) References Cited

FOREIGN PATENT DOCUMENTS

| JP | 2004-213243 | 7/2004 |
| JP | 2005-107842 | 4/2005 |
| JP | 2007-519071 | 7/2007 |
| JP | 2010-508581 | 3/2010 |
| WO | WO-02/099594 | 12/2002 |
| WO | WO 2004/040923 | 5/2004 |
| WO | WO-2005/045562 | 5/2005 |
| WO | WO-2008/054951 | 5/2008 |
| WO | WO-2008/107269 | 9/2008 |

OTHER PUBLICATIONS

"Extended European Search Report" mailed by EPO and corresponding to European application No. 12156981.8 on Aug. 3, 2012.

APPLICATION PROVIDING SYSTEM, APPLICATION PROVIDING METHOD, AND INFORMATION PROCESSING APPARATUS

CROSS-REFERENCE TO RELATED APPLICATIONS

This application is based upon and claims the benefit of priority of the prior Japanese Patent Application No. 2011-076758, filed on Mar. 30, 2011 and Japanese Patent Application No. 2011-125750, filed on Jun. 3, 2011, the entire contents of which are incorporated herein by reference.

FIELD

The embodiments discussed herein are directed to an application providing system, an application providing method, and an information processing apparatus.

BACKGROUND

In recent years, a Web application (hereinafter, referred to simply as "Web app") that provides various applications to a client on a Web server is widely known. The client performs various processing using the online Web app on the side of the Web server without installing applications.

Furthermore, in recent years, there is a Web-app caching feature in the HTML (Hyper Text Markup Language) 5 standard. The Web-app caching feature caches all resources, components of a Web app, such as HTML, CSS (Cascading Style Sheet), and JavaScript (registered trademark), in an app cache of a Web browser in a client. Then, even when the client is in an off-line state, the client can execute the Web app as a local app on the basis of the resources cached in the app cache.

As related techniques, there can be mentioned those described Japanese National Publication of International Patent Application No. 2010-508581, Japanese National Publication of International Patent Application No. 2007-519071, Japanese Laid-open Patent Publication No. 2004-213243, Japanese Laid-open Patent Publication No. 2005-107842, and Japanese Laid-open Patent Publication No. 2003-308210.

However, the Web-app caching feature requests a resource used in a Web app from a Web server upon a request operation made on a client, and acquires the resource of the Web app from the Web server. Then, the Web-app caching feature caches the acquired resource of the Web app in an app cache of a Web browser in the client. Namely, in such a Web-app caching system, it is difficult to acquire a resource of a Web app in the case that no request operation is made on a client.

SUMMARY

According to an aspect of an embodiment of the invention, an application providing system includes communication devices and an address management device that manages a storage location address of resource information of a Web application, wherein the address management device includes an address managing unit that manages identification information for identifying the communication device, a storage location address of resource information relating to a Web application to be provided to the communication device, and providing timing to provide the Web application to the communication device, in a manner associated with one another; a timing monitoring unit that monitors whether the current timing is providing timing; and a providing unit that provides the storage location address of resource information relating to a Web application associated with providing timing to the communication device associated with the providing timing when the timing monitoring unit determines that the current timing is the providing timing, and the communication device includes: a requesting unit that issues an application request for resource information of a Web application on the basis of the storage location address upon receipt of the storage location address from the address management device; a temporary storage that temporarily stores therein the resource information of the Web application provided in response to the application request; a cache synchronizing unit that synchronizes the resource information stored in the temporary storage to a cache of a Web browser; and an application executing unit that can execute the Web application on the basis of the resource information stored in the cache.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. Incidentally, the technology discussed herein is not limited to the present embodiments.

[a] First Embodiment

Figure 1:
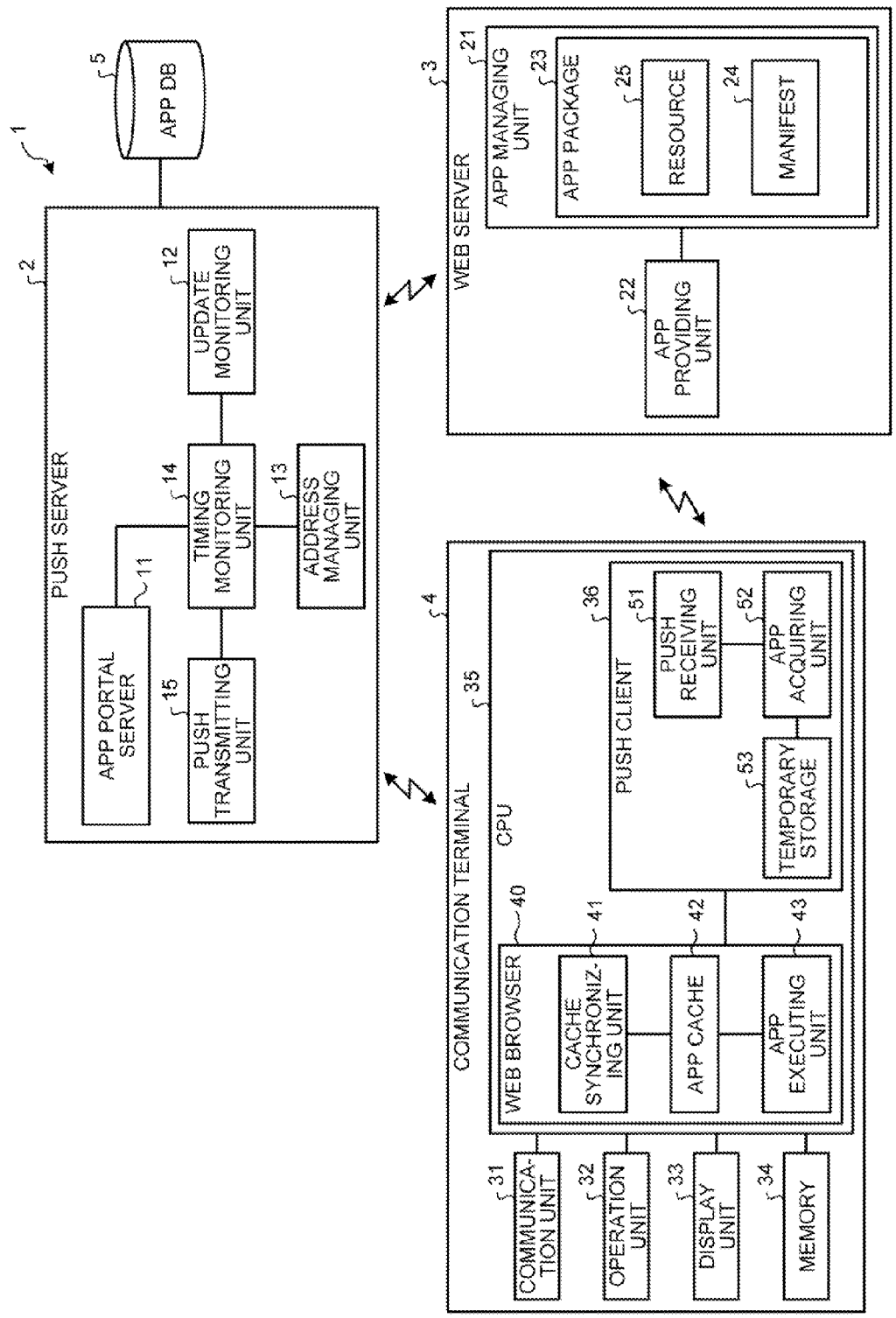
FIG. 1 is a functional block diagram illustrating an example of internals of a Web-app providing system according to a first embodiment.

FIG. 1 is a functional block diagram illustrating an example of internals of a Web-app providing system according to a first embodiment. A Web-app providing system 1 illustrated in FIG. 1 has a push server 2, a Web server 3, and a communication terminal 4. Incidentally, the push server 2, the Web server 3, and the communication terminal 4 are connected over communication networks, such as a wired communication network and a radio communication network, to communicate with one another. The push server 2 has an app portal server 11, an update monitoring unit 12, an address managing unit 13, a timing monitoring unit 14, and a push transmitting unit 15. The app portal server 11 accepts a request for acquisition of a desired resource of a Web app from the communication terminal 4. Incidentally, the resource is a component of the Web app, such as HTML, CSS, or JavaScript. The update monitoring unit 12 accesses an app database (hereinafter, referred to simply as "app DB") 5 that intensively manages update statuses of Web apps managed by Web servers 3, and monitors the update status of a Web app. Incidentally, the update monitoring unit 12 can access a Web server 3 to monitor the update status of a Web app managed by the Web server 3.

Figure 2:
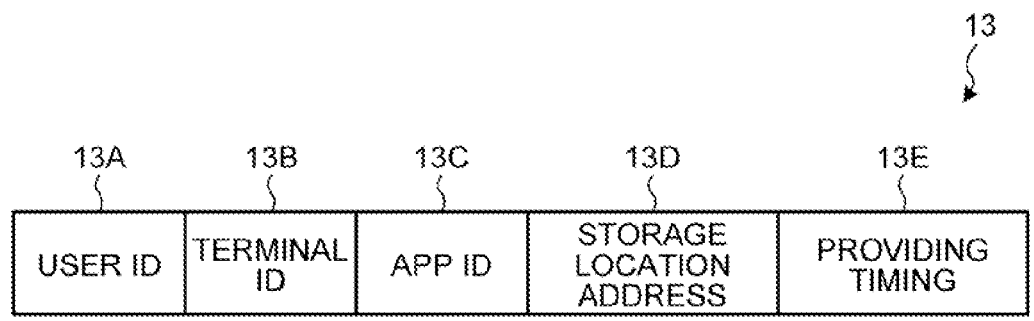
FIG. 2 is an explanatory diagram illustrating an example of contents of a table included in an address managing unit.

FIG. 2 is an explanatory diagram illustrating an example of contents of a table included in the address managing unit 13. The address managing unit 13 illustrated in FIG. 2 dynamically registers/updates contents of a table in which a user ID 13A, a terminal ID 13B, an app ID 13C, a storage location address 13D, and providing timing 13E are stored in a manner associated with one another, and manages the contents of the table. The user ID 13A is, for example, an ID for identifying a user registered in the Web-app providing system 1. The terminal ID 13B is, for example, an ID for identifying a communication terminal 4 owned by a user registered in the Web-app providing system 1. The app ID 13C is an ID for identifying a Web app to be provided to a communication terminal 4. The storage location address 13D is an address of a storage location where a resource of a Web app to be provided is managed. The providing timing 13E is conditional timing to push a storage location address of a Web app to be provided to a communication terminal 4 to the communication terminal 4.

Incidentally, various timings are conceivable as an example of the providing timing 13E. For example, when a Web app is a menu browsing app for providing a menu of a restaurant, the providing timing 13E is, for example, the timing at which a communication terminal 4 enters within a communication area near the restaurant. Furthermore, when a Web app is a textbook browsing app for providing a textbook of a school, the providing timing 13E is the timing at which a communication terminal 4 enters within a communication area on the site of the school. Moreover, when a Web app is a material distributing app for distributing a material of a meeting, the providing timing 13E is the timing at which a communication terminal 4 enters within a communication area in a meeting room for the meeting. Furthermore, when a Web app is updated, the providing timing 13E is the timing at which a communication terminal 4 through which the Web app is used enters within a predetermined communication area.

The timing monitoring unit 14 determines whether the current timing is the providing timing 13E on the basis of the providing timing 13E managed in the address managing unit 13. When the current timing is the providing timing 13E, the timing monitoring unit 14 acquires a user ID 13A, a terminal ID 13B, and a storage location address 13D which are associated with the providing timing 13E from the address managing unit 13. The timing monitoring unit 14 identifies a communication terminal 4 meeting the providing timing on the basis of the acquired terminal ID 13B. Furthermore, the timing monitoring unit 14 identifies a storage location of a resource of a Web app to be provided to the communication terminal 4 meeting the providing timing on the basis of the acquired storage location address 13D. When push transmission to the communication terminal 4 identified by the timing monitoring unit 14 is possible, the push transmitting unit 15 pushes the storage location address to the communication terminal 4.

Each Web server 3 has an app managing unit 21 and an app providing unit 22. The app managing unit 21 manages an app package 23 storing therein a resource of a Web app and the like with respect to each storage location address. The app package 23 includes a manifest 24 and a resource 25. The manifest 24 is a list of resources of a Web app. The resource 25 is a set of resources used in a Web app. Upon detection of an app request from a communication terminal 4, the app providing unit 22 acquires a manifest 24 and resource 25 of a Web app requested in the app request from the app managing unit 21. Furthermore, the app providing unit 22 provides the acquired manifest 24 and resource 25 of the Web app to the communication terminal 4 which has issued the app request.

The communication terminal 4 corresponds to a device equipped with a communication function, such as a mobile device, a smartphone, a personal computer, or a tablet terminal. The communication terminal 4 has a communication unit 31, an operation unit 32, a display unit 33, a memory 34, and a CPU 35. The communication unit 31 establishes a communication connection to another communication terminal 4 or a server, etc. over a communication network or the like. The operation unit 32 inputs various commands. The display unit 33 displays thereon a variety of information. The memory 34 stores therein a variety of information and the like. The CPU 35 controls the entire communication terminal 4. The CPU 35 implements software functions, such as a push client 36 and a Web browser 40.

The push client 36 has a push receiving unit 51, an app acquiring unit 52, and a temporary storage 53. The push receiving unit 51 receives a storage location address where a resource of a Web app associated with the providing timing has been stored from the push server 2. The app acquiring unit 52 requests a resource of a Web app from the Web server 3 on the basis of the storage location address received by the push receiving unit 51. When acquired the resource of the Web app from the Web server 3, the app acquiring unit 52 registers the resource of the Web app in the temporary storage 53.

The Web browser 40 has a cache synchronizing unit 41, an app cache 42, and an app executing unit 43. The cache synchronizing unit 41 converts the resource registered in the temporary storage 53 into a data format that the CPU 35 can interpret, and caches the converted resource in the app cache 42. The app executing unit 43 executes the Web app on the basis of the resource cached in the app cache 42. Incidentally, the cache synchronizing unit 41 can reside outside of the Web browser 40.

There are a pull approach and a push approach in the Web-app providing system 1. In the pull approach, a communication terminal 4 requests a storage location address of a desired resource of a Web app from the app portal server 11 in the push server 2. Then, the communication terminal 4 acquires the resource of the Web app on the basis of the storage location address obtained from the push server 2. On the other hand, in the push approach, as described above, the push server 2 provides a storage location address of a resource of a Web app to a communication terminal 4 in accordance with the providing timing to provide the Web app. Then, the communication terminal 4 acquires the resource of the Web app on the basis of the storage location address obtained from the push server 2.

Figure 3:
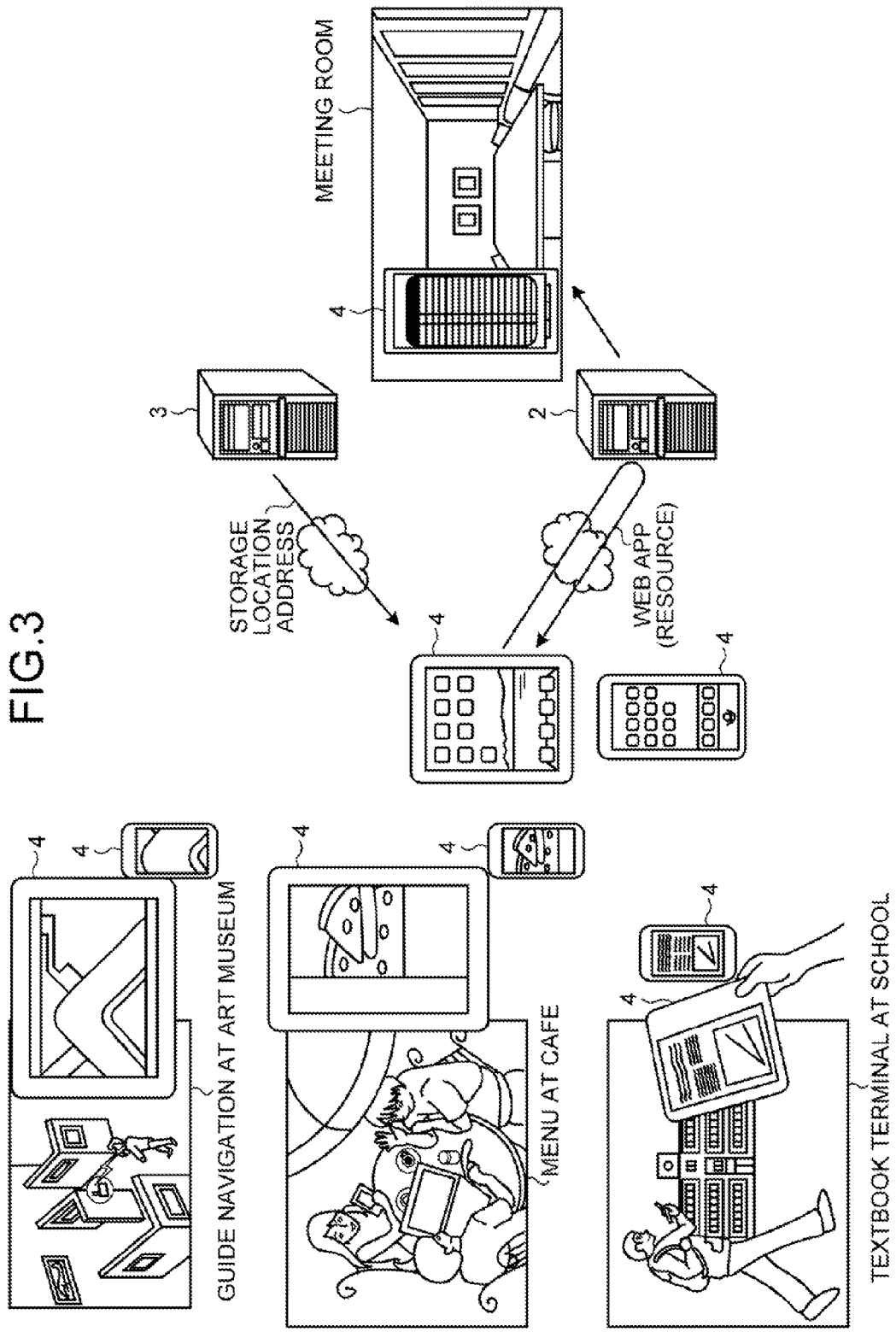
FIG. 3 is an explanatory diagram illustrating an example of usage of the Web-app providing system according to the first embodiment.

Subsequently, the operation of the Web-app providing system 1 according to the first embodiment is explained. FIG. 3 is an explanatory diagram illustrating an example of usage of the Web-app providing system 1 according to the first embodiment. The Web-app providing system 1 illustrated in FIG. 3 has the push server 2, the Web server 3, and communication terminals 4.

When a user of a communication terminal 4 enters an art museum, the push server 2 determines that it is the providing timing, and pushes a storage location address of a resource of a museum guide navigation Web app to the communication terminal 4. Then, the communication terminal 4 acquires the resource of the museum guide navigation Web app from the Web server 3 on the basis of the storage location address received from the push server 2, and caches the acquired resource. Then, the communication terminal 4 executes the guide navigation Web app on the basis of the cached resource. As a result, the user can receive information on the art museum in the guide navigation app without performing an acquisition operation to acquire the guide navigation Web app.

Furthermore, when a user of a communication terminal 4 comes near a cafe, the push server 2 determines that it is the providing timing, and pushes a storage location address of a resource of a cafe menu browsing Web app to the communication terminal 4. Then, the communication terminal 4 acquires the resource of the menu browsing Web app from the Web server 3 on the basis of the storage location address received from the push server 2, and caches the acquired resource. Then, the communication terminal 4 executes the menu browsing Web app on the basis of the cached resource. As a result, the user can browse a menu of the cafe in the menu browsing app without performing an acquisition operation to acquire the menu browsing Web app.

Moreover, when a user of a communication terminal 4 comes to school, the push server 2 determines that it is the providing timing, and pushes a storage location address of a resource of a textbook browsing Web app to the communication terminal 4. Then, the communication terminal 4 acquires the resource of the textbook browsing Web app from the Web server 3 on the basis of the storage location address received from the push server 2, and caches the acquired resource.

Then, the communication terminal 4 executes the textbook browsing Web app on the basis of the cached resource. As a result, the user can browse a school textbook in the textbook browsing app without performing an acquisition operation to acquire the textbook browsing Web app.

Furthermore, when a user of a communication terminal 4 enters a meeting room, the push server 2 determines that it is the providing timing, and pushes a storage location address of a resource of a presentation material browsing Web app to the communication terminal 4. Then, the communication terminal 4 acquires the resource of the material browsing Web app from the Web server 3 on the basis of the storage location address received from the push server 2, and caches the acquired resource. Then, the communication terminal 4 executes the material browsing Web app on the basis of the cached resource. As a result, the user can browse a presentation material in the material browsing app without performing an acquisition operation to acquire the material browsing Web app.

Figure 4:
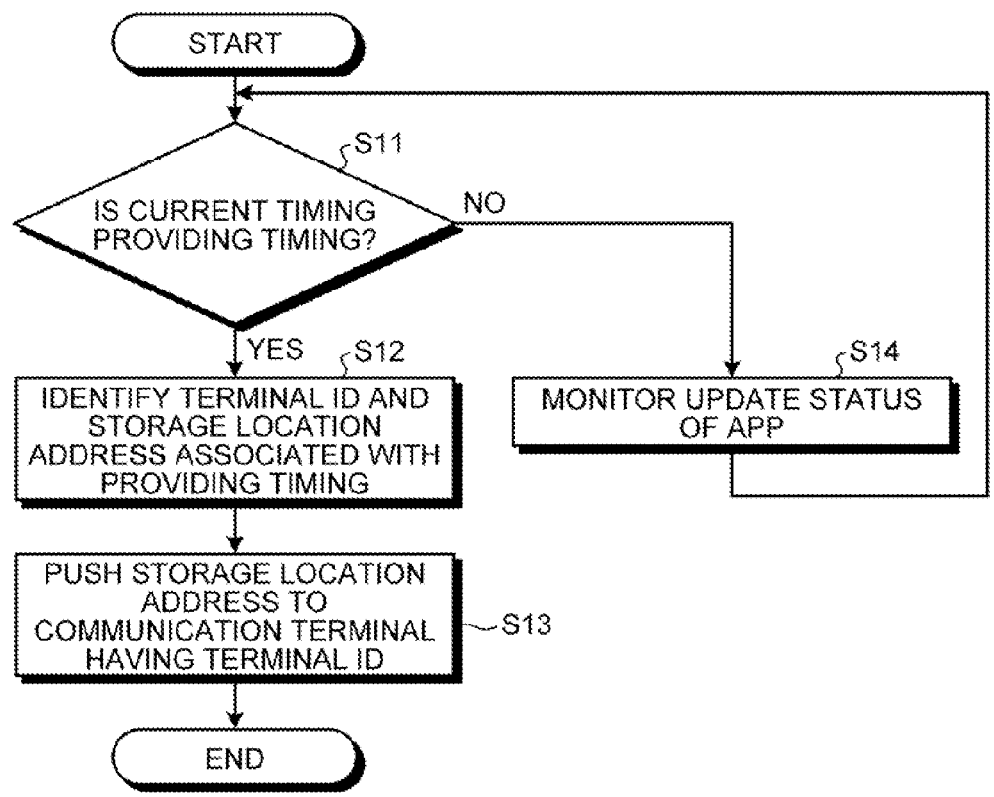
FIG. 4 is a flowchart illustrating an example of a processing operation of a push server involved in an address providing process.

FIG. 4 is a flowchart illustrating an example of a processing operation of the push server 2 involved in an address providing process. The address providing process illustrated in FIG. 4 is a process to monitor the providing timing to provide a Web app and, when the providing timing is detected, push a storage location address of a resource relating to a Web app to be provided to a communication terminal 4 corresponding to the providing timing. The timing monitoring unit 14 of the push server 2 determines whether the current timing is the providing timing that is currently managed by the address managing unit 13 (Step S11). When the current timing is the providing timing (YES at Step S11), the timing monitoring unit 14 identifies a terminal ID 13B and a storage location address 13D which are associated with the providing timing from the address managing unit 13 (Step S12).

After the terminal ID 13B and the storage location address 13D are identified, the push transmitting unit 15 of the push server 2 pushes the storage location address 13D to a communication terminal 4 having the terminal ID 13B (Step S13), and the processing operation illustrated in FIG. 4 is terminated. Incidentally, the push transmitting unit 15 determines whether it is in a fit state to communicate with the communication terminal 4 having the terminal ID 13B, and when it is in a fit state to communicate with the communication terminal 4, the push transmitting unit 15 pushes the storage location address 13D to the communication terminal 4. Furthermore, when the current timing is not the providing timing (NO at Step S11), the update monitoring unit 12 of the push server 2 monitors the update status of each Web app in the app DB 5 (Step S14), and the process moves on to Step S11 to monitor the providing timing.

In the address providing process illustrated in FIG. 4, the providing timing to provide a Web app is monitored, and when the providing timing is detected, a storage location address of a resource of a Web app to be provided is pushed to a communication terminal 4 corresponding to the providing timing. As a result, the communication terminal 4 can recognize the storage location address of the resource of the Web app associated with the providing timing.

Figure 5:
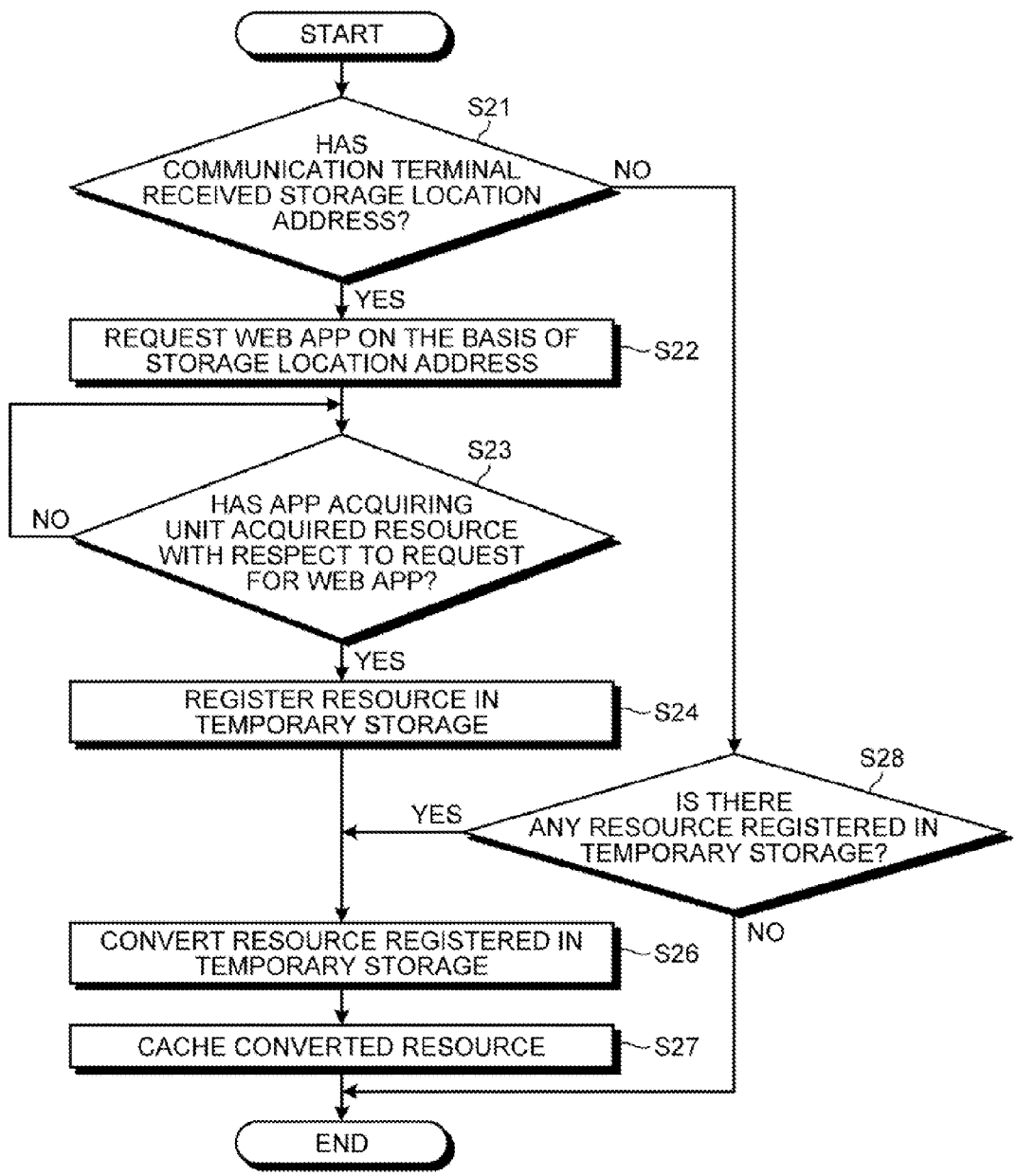
FIG. 5 is a flowchart illustrating an example of a processing operation of a communication terminal involved in a Web-app acquiring process.

FIG. 5 is a flowchart illustrating an example of a processing operation of a communication terminal 4 involved in a Web-app acquiring process. The Web-app acquiring process illustrated in FIG. 5 is a process to acquire a resource of a Web app from the Web server 3 on the basis of a storage location address obtained from the push server 2 and cache the acquired resource in the app cache 42. In FIG. 5, the push receiving unit 51 of the push client 36 in the communication terminal 4 determines whether the push receiving unit 51 has received a storage location address from the push server 2 (Step S21). When the push receiving unit 51 has received a storage location address (YES at Step S21), the app acquiring unit 52 of the push client 36 requests a Web app from the Web server 3 on the basis of the storage location address (Step S22). The app acquiring unit 52 determines whether the app acquiring unit 52 has acquired a resource with respect to the request for the Web app (Step S23).

When the app acquiring unit 52 has acquired a resource (YES at Step S23), the app acquiring unit 52 registers the acquired resource in the temporary storage 53 (Step S24). The cache synchronizing unit 41 of the Web browser 40 converts the resource registered in the temporary storage 53 into a data format that the CPU 35 can interpret (Step S26). Furthermore, the cache synchronizing unit 41 caches the converted resource in the app cache 42 (Step S27), and the processing operation illustrated in FIG. 5 is terminated.

When no storage location address is received (NO at Step S21), the app acquiring unit 52 determines whether there is any resource registered in the temporary storage 53 (Step S28). When the app acquiring unit 52 determines that there is a resource registered in the temporary storage 53 (YES at Step S28), the process moves on to Step S26 to convert the registered resource.

On the other hand, when the app acquiring unit 52 determines that there is no resource registered in the temporary storage 53 (NO at Step S28), the processing operation illustrated in FIG. 5 is terminated.

In the Web-app acquiring process illustrated in FIG. 5, a resource of a Web app is acquired from the Web server 3 on the basis of a storage location address obtained from the push server 2, and the resource is cached in the app cache 42. As a result, the communication terminal 4 can execute the Web app on the basis of the cached resource.

In the Web-app acquiring process, regardless of whether the Web browser 40 is running or not, a resource registered in the temporary storage 53 is read out, and the resource is cached in the app cache. Consequently, a Web app based on the providing timing can be automatically acquired.

In the first embodiment, upon detection of the providing timing to provide a Web app, the push server 2 provides a storage location address of a resource of a Web app associated with the providing timing to a communication terminal 4 associated with the providing timing. Then, when received the storage location address, the communication terminal 4 issues an app request for the resource of the Web app on the basis of the storage location address. Furthermore, the communication terminal 4 caches the resource of the Web app provided in response to the app request in the app cache 42, and executes the Web app on the basis of the cached resource of the Web app. Consequently, a user of a communication terminal 4 can automatically obtain a Web app when needed in accordance with the providing timing without performing a request operation for acquisition of an app.

In the first embodiment, the latest resource for execution of a Web app can be obtained without user operation. Furthermore, an app developer does not have to develop a local app with respect to each device and only has to develop one Web app; therefore, the development cost can be reduced. In addition, a user can use an app without performing a troublesome app installation.

Incidentally, in the above first embodiment, the push client 36 is installed in a communication terminal 4 such as a mobile device; alternatively, the push client 36 can be externally connected to a communication terminal 4A such as a personal computer by a universal serial bus (USB). An embodiment in this case is explained as a second embodiment.

[b] Second Embodiment

Figure 6:
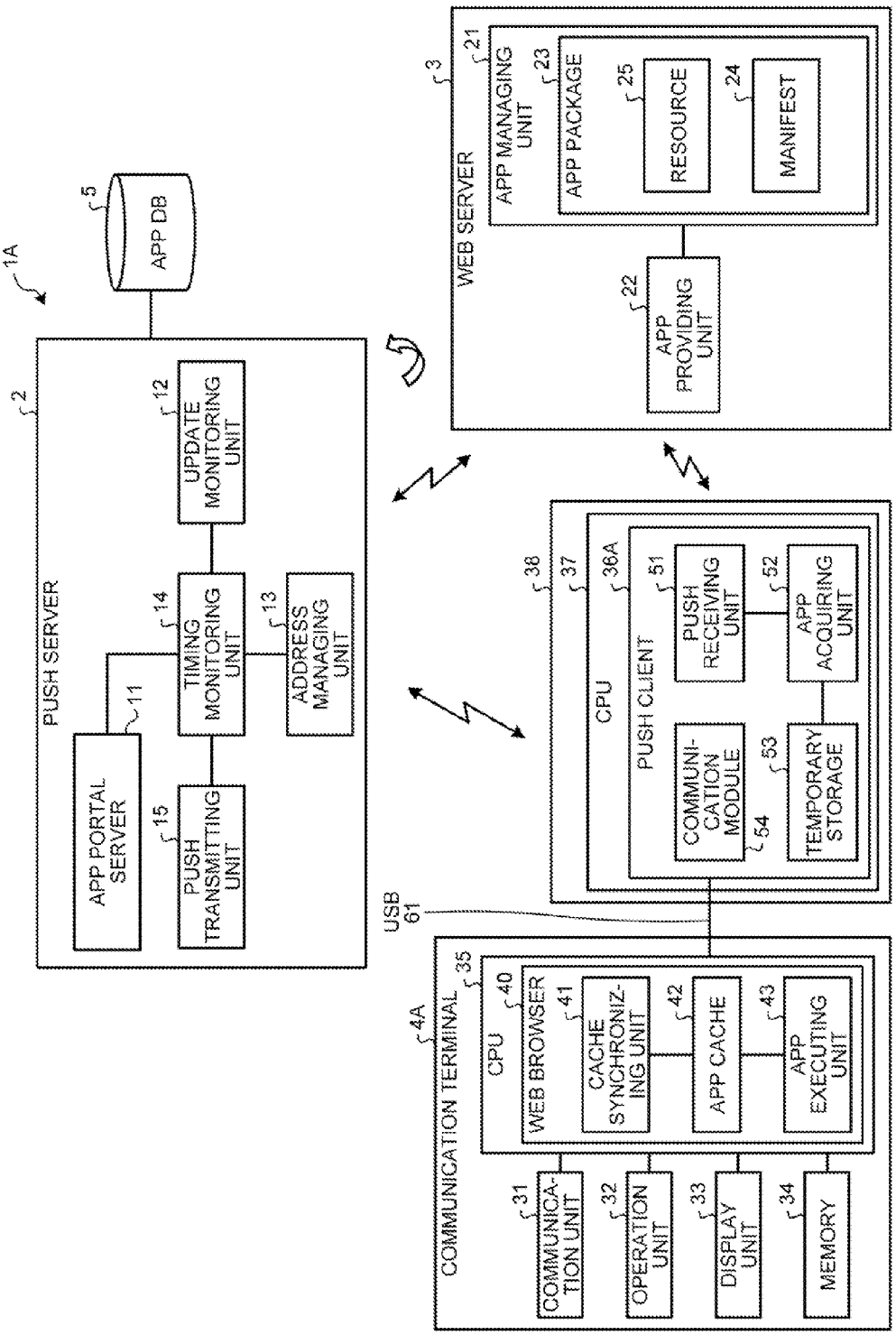
FIG. 6 is a functional block diagram illustrating an example of internals of a Web-app providing system according to a second embodiment.

FIG. 6 is a block diagram illustrating an example of internals of a Web-app providing system 1A according to the second embodiment. Incidentally, components identical to those in the Web-app providing system according to the first embodiment are denoted by the same reference numerals, and explanation of the configurations and operations of those components is omitted.

The Web-app providing system 1A illustrated in FIG. 6 differs from the Web-app providing system 1 illustrated in FIG. 1 in that a push client 36A running on a CPU 37 in an externally-connected device 38 is connected to a communication terminal 4A such as a personal computer by a USB 61. The communication terminal 4A illustrated in FIG. 6 has the communication unit 31, the operation unit 32, the display unit 33, the memory 34, and the CPU 35. The communication terminal 4A is connected to the push client 36A running on the CPU 37 by the USB 61. The push client 36A has a communication module 54 in addition to the push receiving unit 51, the app acquiring unit 52, and the temporary storage 53. The communication module 54 enables receiving of information pushed from the push server 2 even when the communication terminal 4A is in a power-off state.

Figure 7:
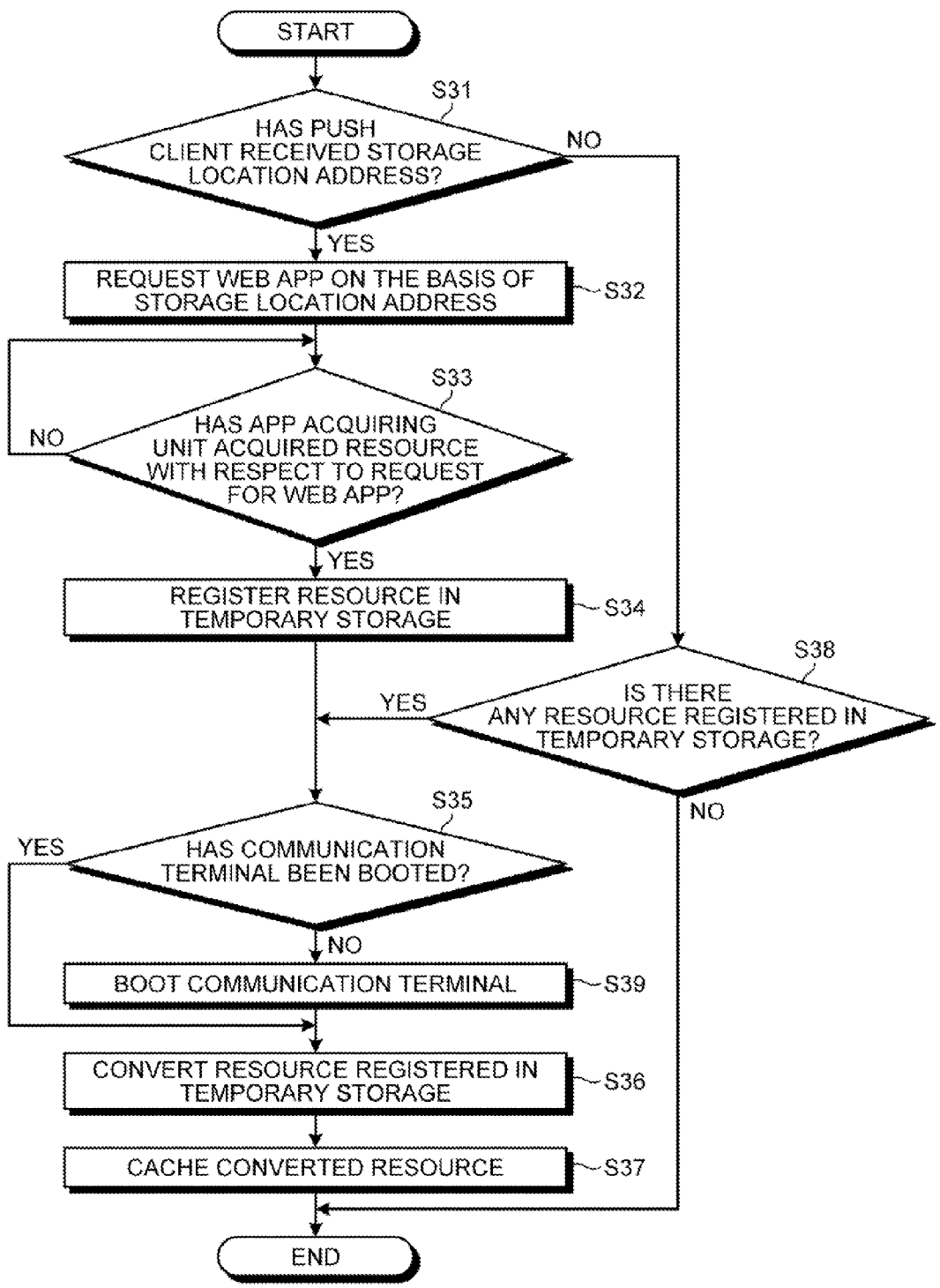
FIG. 7 is a flowchart illustrating an example of processing operations of a communication terminal and a push client which are involved in a Web-app acquiring process according to the second embodiment.

FIG. 7 is a flowchart illustrating an example of processing operations of the communication terminal 4A and the push client 36A which are involved in a Web-app acquiring process according to the second embodiment. Upon detection of the providing timing, the push server 2 transmits a storage location address of a resource of a Web app associated with the providing timing to the push client 36A even when the communication terminal 4A is in a power-off state.

In FIG. 7, the push receiving unit 51 of the push client 36A determines whether the push receiving unit 51 has received a storage location address from the push server 2 (Step S31). When the push receiving unit 51 has received a storage location address (YES at Step S31), the app acquiring unit 52 of the push client 36A transmits a request for a Web app associated with the storage location address to the Web server 3 (Step S32). The app acquiring unit 52 determines whether the app acquiring unit 52 has acquired a resource of the Web app stored at the storage location address on the side of the Web server 3 with respect to the request for the Web app (Step S33). When the app acquiring unit 52 has acquired a resource of the Web app (YES at Step S33), the app acquiring unit 52 registers the acquired resource in the temporary storage 53 (Step S34).

When the resource has been registered in the temporary storage 53, the CPU 37 of the push client 36A determines whether the communication terminal 4A has been booted (Step S35). When the communication terminal 4A has been booted (YES at Step S35), the cache synchronizing unit 41 of the Web browser 40 in the communication terminal 4A converts the resource registered in the temporary storage 53 of the push client 36A into a data format that the CPU 35 can interpret (Step S36). Furthermore, the cache synchronizing unit 41 caches the converted resource in the app cache 42 (Step S37). As a result, the app executing unit 43 of the Web browser 40 executes the Web app on the basis of the resource cached in the app cache 42.

When no storage location address is received (NO at Step S31), the app acquiring unit 52 determines whether there is any resource registered in the temporary storage 53 (Step S38). When the app acquiring unit 52 determines that there is a resource registered in the temporary storage 53 (YES at Step S38), the process moves on to Step S35 to determine whether the communication terminal 4A has been booted.

On the other hand, when the app acquiring unit 52 determines that there is no resource registered in the temporary storage 53 (NO at Step S38), the processing operation illustrated in FIG. 7 is terminated. Furthermore, when the communication terminal 4A has not been booted (NO at Step S35), the CPU 37 powers on the communication terminal 4A and runs the Web browser 40 (Step S39), and the process moves on to Step S36 to convert the resource registered in the temporary storage 53.

In the second embodiment, as the push client 36A includes the communication module 54, the push client 36A receives a storage location address from the push server 2 even when the communication terminal 4A is in a power-off state. Consequently, the push client 36A can receive a storage location address from the push server 2 even when the communication terminal 4A is in a power-off state.

In addition, in the second embodiment, upon detection of the providing timing to provide a Web app, a storage location address of a resource of the Web app is transmitted to the push client 36A associated with the providing timing. Then, the push client 36A receives the resource of the Web app from the Web server 3 on the basis of the received storage location address. The push client 36A caches the resource in the app cache 42 of the Web browser 40. The app executing unit 43 of the Web browser 40 executes the Web app on the basis of the cached resource. Consequently, a user of a communication terminal 4A can automatically obtain a necessary Web app when needed in accordance with the providing timing without performing a request operation for acquisition of an app.

Incidentally, in the above embodiment, the timing monitoring unit 14 monitors the providing timing with respect to each communication terminal 4A identified by a terminal ID 13B on the basis of the providing timing 13E with respect to each terminal ID 13B in the address managing unit 13. Alternatively, the timing monitoring unit 14 can monitor the providing timing 13E with respect to each user ID 13A in the address managing unit 13; in this case, the providing timing with respect to each user identified by a user ID 13A is monitored.

Furthermore, in the above embodiment, the app managing unit 21, which manages resources of a Web app, is under the management of the Web server 3; alternatively, the app managing unit 21 can be incorporated in the push server 2. In this case, upon detection of the providing timing, the timing monitoring unit 14 of the push server 2 identifies a terminal ID 13B and a storage location address 13D which are associated with the providing timing. The timing monitoring unit 14 acquires a resource from the app managing unit 21 in the push server 2 on the basis of the storage location address 13D. Then, the push transmitting unit 15 pushes the resource of the Web app associated with the providing timing to a communication terminal 4,4A having the terminal ID 13B.

Moreover, in the above embodiment, when a user of a communication terminal 4,4A enters a meeting room, the push server 2 determines that it is the providing timing, and provides a storage location address of a resource relating to a presentation material browsing Web app to the communication terminal 4,4A in accordance with the providing timing. Then, the communication terminal 4,4A acquires the resource relating to the presentation material browsing Web app on the basis of the storage location address, and caches the acquired resource. At this time, in consideration of the confidentiality of a presentation material, it is preferable to disable the presentation material browsing Web app after the user leaves the meeting room. Therefore, the push server 2 can include a managing unit that manages a terminal ID of a communication terminal 4,4A provided with a Web app to be disabled, an app ID for identifying the Web app to be disabled, and the disabling timing to disable the Web app in a manner associated with one another.

In this case, when a user of a communication terminal 4,4A leaves the meeting room, the timing monitoring unit 14 of the push server 2 determines that it is the disabling timing. In accordance with the disabling timing, the timing monitoring unit 14 acquires a terminal ID and an app ID which are associated with the disabling timing from the managing unit. The timing monitoring unit 14 identifies a communication terminal 4,4A to be prohibited from using a Web app on the basis of the acquired terminal ID, and also identifies the Web app to be disabled on the basis of the acquired app ID. The push transmitting unit 15 notifies the communication terminal 4,4A of a request to disable the Web app such as the presentation material browsing Web app. Upon receipt of the request to disable the Web app, the communication terminal 4,4A erases the cached resource of the presentation material browsing Web app so that the communication terminal 4,4A cannot execute the Web app. As a result, the user of the communication terminal 4,4A cannot browse the material browsing Web app after leaving the meeting room, and therefore, it is possible to ensure the confidentiality of the presentation material.

[c] Third Embodiment

Figure 8:
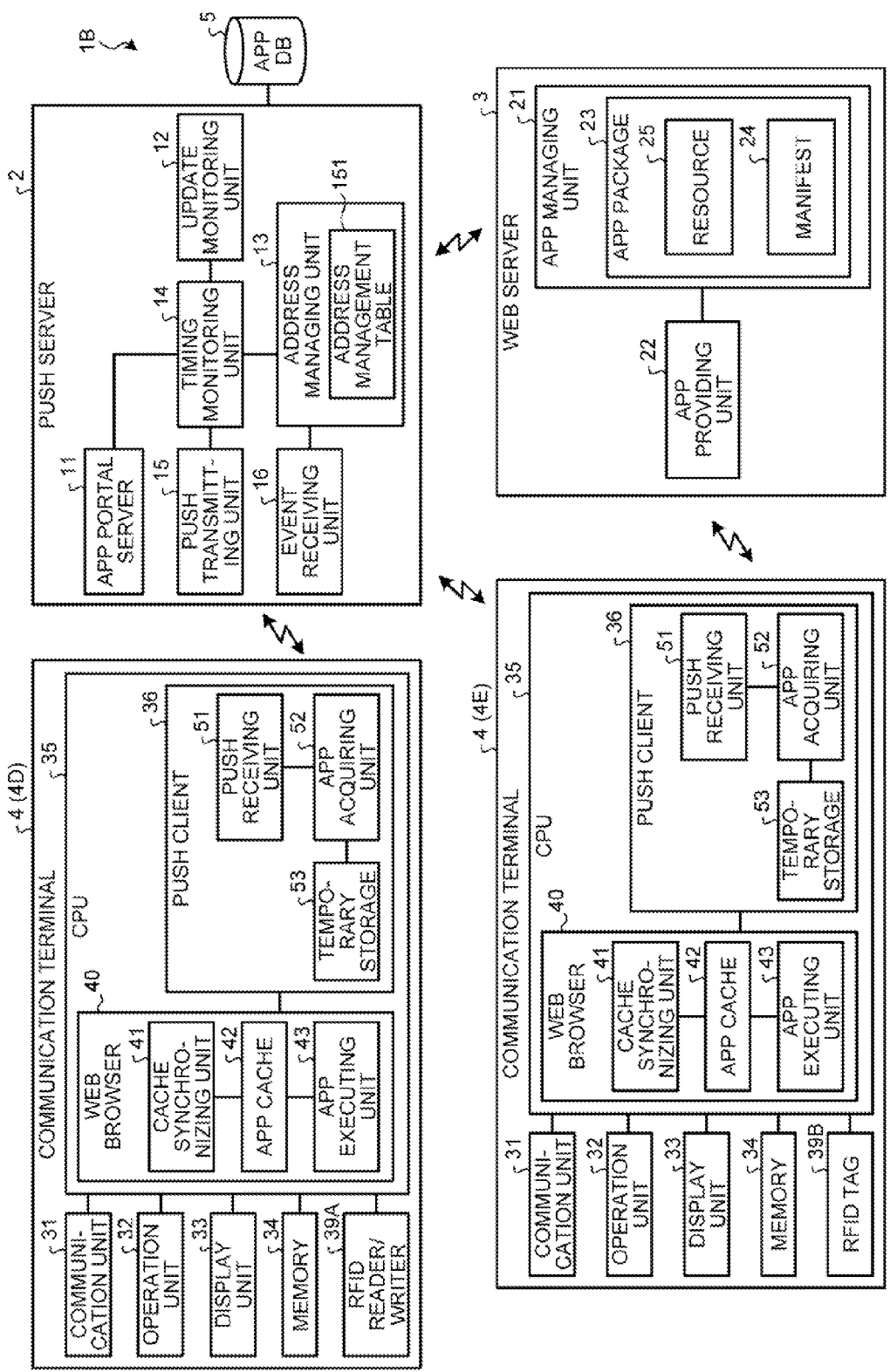
FIG. 8 is a functional block diagram illustrating an example of internals of a Web-app providing system according to a third embodiment.

FIG. 8 is a functional block diagram illustrating an example of internals of a Web-app providing system according to a third embodiment. Incidentally, components identical to those in the Web-app providing system 1 illustrated in FIG. 1 are denoted by the same reference numerals, and explanation of the configurations and operations of those components is omitted. A Web-app providing system 1B illustrated in FIG. 8 differs from the Web-app providing system 1 illustrated in FIG. 1 in that a Web app being executed by a source communication terminal 4D can be also executed on the side of a destination communication terminal 4E with simple operation. Incidentally, the source communication terminal 4D is a communication terminal 4 that is executing a Web app. On the other hand, the destination communication terminal 4E is a communication terminal 4 that is caused to execute the same Web app as the Web app being executed by the source communication terminal 4D.

Figure 9:
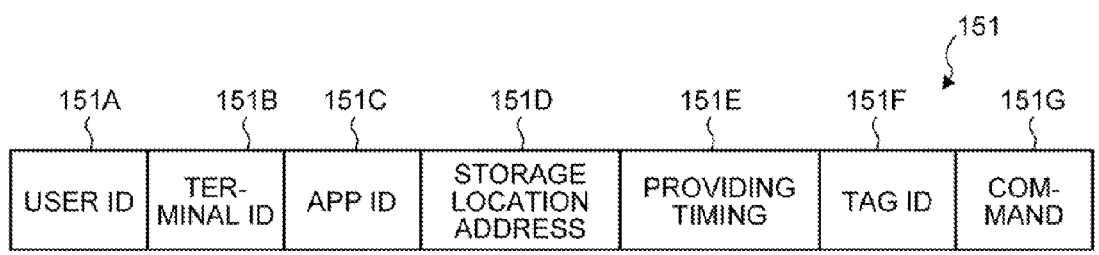
FIG. 9 is an explanatory diagram illustrating an example of contents of an address management table.

The push server 2 illustrated in FIG. 8 has an event receiving unit 16 in addition to the app portal server 11, the update monitoring unit 12, the address managing unit 13, the timing monitoring unit 14, and the push transmitting unit 15. The event receiving unit 16 receives event information to be described below from the source communication terminal 4D. The address managing unit 13 manages an address management table 151, and dynamically updates/registers contents of the address management table 151. FIG. 9 is an explanatory diagram illustrating an example of contents of the address management table 151. The address management table 151 illustrated in FIG. 9 manages a tag ID 151F and a command 151G in addition to a user ID 151A, a terminal ID 151B, an app ID 151C, a storage location address 151D, and providing timing 151E in a manner associated with one another. The tag ID 151F is an ID for identifying an aftermentioned RFID tag 39B embedded in the communication terminal 4E. The command 151G is execution content of a Web app identified by the storage location address 151D. Incidentally, commands 151G, execution contents of a Web app, include, for example, download and execute, download only, execute only, erase, and the like.

The source communication terminal 4D has a radio frequency identification (RFID) reader/writer 39A in addition to the communication unit 31, the operation unit 32, the display unit 33, the memory 34, and the CPU 35. The destination communication terminal 4E has the RFID tag 39B in addition to the communication unit 31, the operation unit 32, the display unit 33, the memory 34, and the CPU 35. The RFID reader/writer 39A performs near field communication with the RFID tag 39B within a predetermined communication distance.

The RFID reader/writer 39A of the source communication terminal 4D initiates near field communication with the RFID tag 39B in accordance with an app move operation made on the destination communication terminal 4E. Incidentally, an error in operation can be prevented by setting the app move operation to a duplex operation consisting of an operation to pass the RFID tag 39B over the RFID reader/writer 39A and a specific operation of the display unit 33 or the operation unit 32. When acquired a tag ID of the RFID tag 39B through the RFID reader/writer 39A, the CPU 35 generates move event information including the tag ID.

Incidentally, the move event information includes the tag ID, a storage location address, event content, and a command. The tag ID is an ID for identifying the RFID tag 39B on the side of the destination communication terminal 4E. The storage location address is a storage location address of a resource relating to a Web app that is being executed by the source communication terminal 4D and will be also executed by the destination communication terminal 4E. The event content is a move event to cause the destination communication terminal 4E to execute the same Web app as that is being executed by the source communication terminal 4D. The command is execution content of the Web app to be executed by the destination communication terminal 4E, such as download and execute, download only, execute only, erase, or the like.

The communication unit 31 of the source communication terminal 4D transmits the generated move event information to the push server 2. The event receiving unit 16 of the push server 2 receives the move event information from the source communication terminal 4D. Upon receipt of the move event information, the address managing unit 13 of the push server 2 updates providing timing 151E in the address management table 151 corresponding to a terminal ID 151B associated with the tag ID 151F included in the move event information to "immediate". Furthermore, the address managing unit 13 updates a command 151G in the address management table 151 corresponding to the terminal ID 151B to the command included in the move event information.

The timing monitoring unit 14 monitors whether the current timing is the providing timing 151E with reference to the providing timing 151E managed in the address managing unit 13. When the providing timing 151E is "immediate", the address managing unit 13 immediately identifies a terminal ID 151B, a storage location address 151D, and a command 151G which are associated with the providing timing 151E from the address management table 151. Incidentally, the address managing unit 13 includes, for example, a table in which storage location addresses of resources of Web apps are managed with respect to each type of terminal, and identifies a type of a communication terminal having the terminal ID 151B. When identified the type of the communication terminal 4 having the terminal ID 151B, the address managing unit 13 determines whether a Web app corresponding to the storage location address meets the type of the notifying communication terminal 4. When it does not meet the type of the communication terminal 4, the address managing unit 13 identifies a storage location address 151D applicable to the type of the communication terminal 4.

After the terminal ID 151B, the storage location address 151D, and the command 151G are identified, the push transmitting unit 15 determines whether it is in a fit state for push transmission to the destination communication terminal 4E having the terminal ID 151B. When it is in a fit state for push transmission, the push transmitting unit 15 pushes the storage location address 151D and the command 151G to the destination communication terminal 4E having the terminal ID 151B.

Upon receipt of the storage location address and the command from the push server 2, the push receiving unit 51 of the destination communication terminal 4E requests a Web app from the Web server 3 on the basis of the storage location address. When acquiring a resource with respect to the request for the Web app, the app acquiring unit 52 registers the acquired resource in the temporary storage 53. Then, the cache synchronizing unit 41 converts the resource registered in the temporary storage 53 into a data format that the CPU 35 can interpret. Furthermore, the cache synchronizing unit 41 caches the converted resource in the app cache 42. Then, the app executing unit 43 executes the Web app by resource cached in the app cache 42 on the basis of the command received from the push server 2.

Namely, the destination communication terminal 4E can execute the same Web app as that is being executed by the source communication terminal 4D in accordance with an app move operation to move the app from the source communication terminal 4D.

Figure 10:
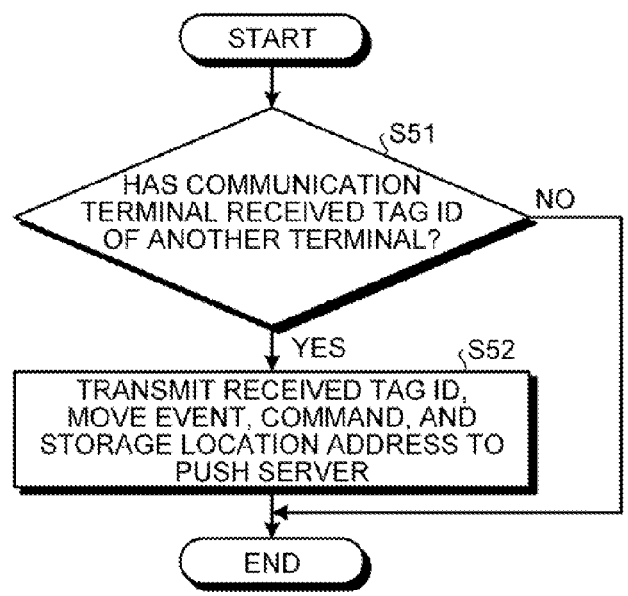
FIG. 10 is a flowchart illustrating an example of a processing operation of a source communication terminal.

Subsequently, the operation of the Web-app providing system 1B according to the third embodiment is explained. FIG. 10 is a flowchart illustrating an example of a processing operation of the source communication terminal 4D. In FIG. 10, the RFID reader/writer 39A of the source communication terminal 4D determines whether the RFID reader/writer 39A has received a tag ID of the destination communication terminal 4E via near field communication in accordance with an app move operation to move an app to the destination communication terminal 4E (Step S51). When the RFID reader/writer 39A has received a tag ID (YES at Step S51), the CPU 35 of the source communication terminal 4D transmits move event information including the tag ID, a move event, a storage location address, and a command to the push server 2 (Step S52), and the processing operation illustrated in FIG. 10 is terminated. Furthermore, when the RFID reader/writer 39A has not received a tag ID of the destination communication terminal 4E (NO at Step S51), the processing operation illustrated in FIG. 10 is terminated.

Figure 11:
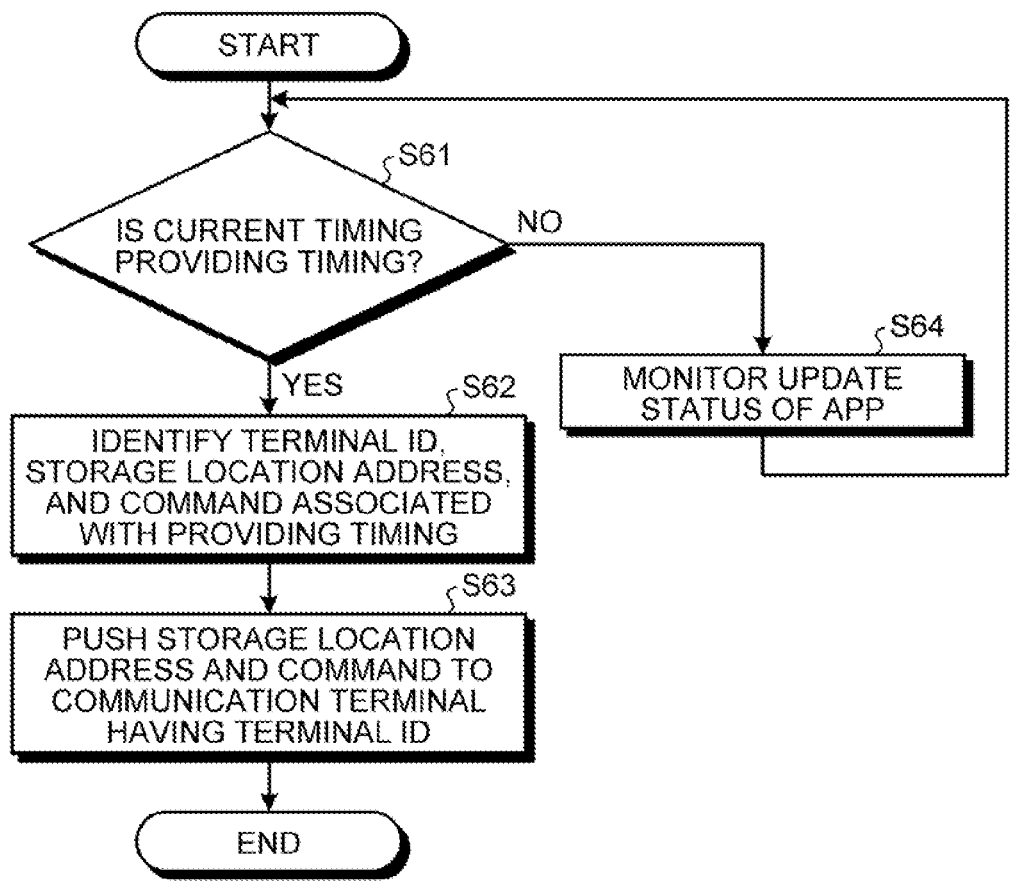
FIG. 11 is a flowchart illustrating an example of a processing operation of the push server involved in an address providing process.

FIG. 11 is a flowchart illustrating an example of a processing operation of the push server 2 involved in an address providing process. The address providing process illustrated in FIG. 11 is a process to push a storage location address of a resource relating to a Web app to be provided and a command to a communication terminal 4 corresponding to the providing timing when it is the providing timing now. In FIG. 11, the timing monitoring unit 14 of the push server 2 determines whether the current timing is the providing timing that is currently managed by the address managing unit 13 (Step S61). Incidentally, when the providing timing is "immediate", the timing monitoring unit 14 determines that the current timing is the providing timing. When the current timing is the providing timing (YES at Step S61), the timing monitoring unit 14 identifies a terminal ID 151B, a storage location address 151D, and a command 151G which are associated with the providing timing from the address managing unit 13 (Step S62).

After the terminal ID 151B, the storage location address 151D, and the command 151G are identified, the push transmitting unit 15 of the push server 2 pushes the storage location address 151D and the command 151G to a communication terminal 4 having the terminal ID 151B (Step S63). Then, the processing operation illustrated in FIG. 11 is terminated. Incidentally, the push transmitting unit 15 determines whether it is in a fit state to communicate with the communication terminal 4 having the terminal ID 151B, and when it is in a fit state to communicate with the communication terminal 4, the push transmitting unit 15 pushes the storage location address 151D and the command 151G to the communication terminal 4. Furthermore, when the current timing is not the providing timing (NO at Step S61), the update monitoring unit 12 of the push server 2 monitors the update status of each Web app in the app DB 5 (Step S64), and the process moves on to Step S61 to monitor the providing timing.

In the address providing process illustrated in FIG. 11, when it is the providing timing now, a storage location address of a resource of a Web app to be provided and a command are pushed to the destination communication terminal 4E corresponding to the providing timing. As a result, the destination communication terminal 4E obtains the storage location address of the resource of the Web app and the command which are associated with the providing timing.

Figure 12:
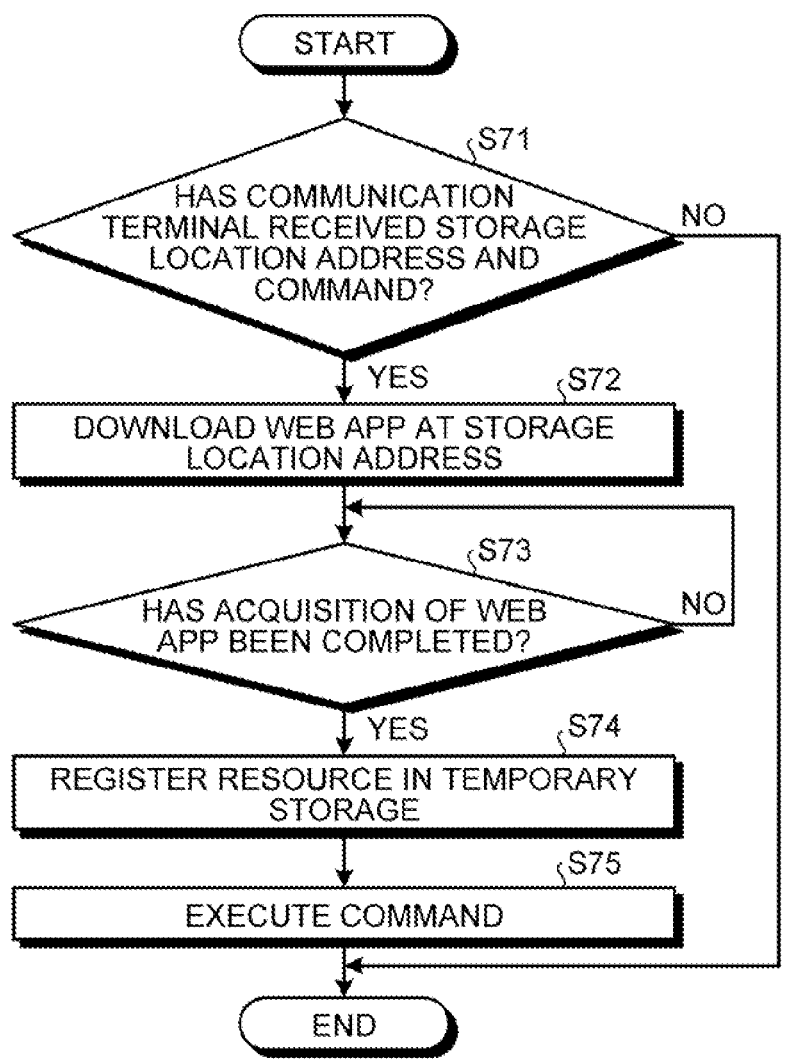
FIG. 12 is a flowchart illustrating an example of a processing operation of a destination communication terminal.

FIG. 12 is a flowchart illustrating an example of a processing operation of the destination communication terminal 4E. In FIG. 12, the push receiving unit 51 of the destination communication terminal 4E determined whether the push receiving unit 51 has received a storage location address and a command from the push server 2 (Step S71). When the push receiving unit 51 has received a storage location address and a command (YES at Step S71), the app acquiring unit 52 of the destination communication terminal 4E downloads a resource of a Web app from the Web server 3 on the basis of the storage location address (Step S72).

The app acquiring unit 52 determines whether the app acquiring unit 52 has completed the acquisition of the resource of the Web app (Step S73). Upon completion of the acquisition of the resource relating to the Web app (YES at Step S73), the app acquiring unit 52 registers the resource of the Web app in the temporary storage 53 (Step S74). Then, the app executing unit 43 caches the resource of the Web app registered in the temporary storage 53 in the app cache 42, and executes the cached resource of the Web app on the basis of the command received at Step S71 (Step S75). Then, the processing operation illustrated in FIG. 12 is terminated.

Furthermore, when the push receiving unit 51 has not received a storage location address and a command from the push server 2 (NO at Step S71), the processing operation illustrated in FIG. 12 is terminated. Furthermore, when the app acquiring unit 52 has not completed the acquisition of the resource of the Web app (NO at Step S73), the monitoring operation at Step S73 is continuously performed.

Upon receipt of the storage location address and the command from the push server 2, the destination communication terminal 4E acquires the Web app on the basis of the storage location address, and executes the Web app on the basis of the command. As a result, the destination communication terminal 4E can execute the same Web app as that is being executed by the source communication terminal 4D.

Figure 13A:
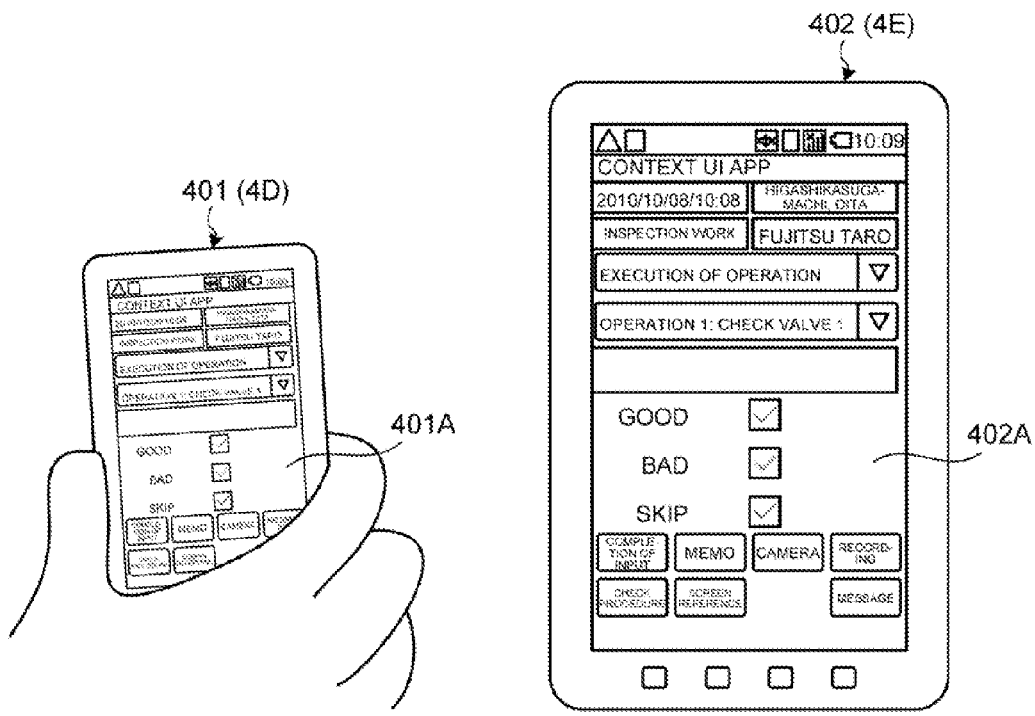
FIG. 13A is an explanatory diagram illustrating an example of coordinated operations of a source communication terminal and a destination communication terminal.
Figure 13B:
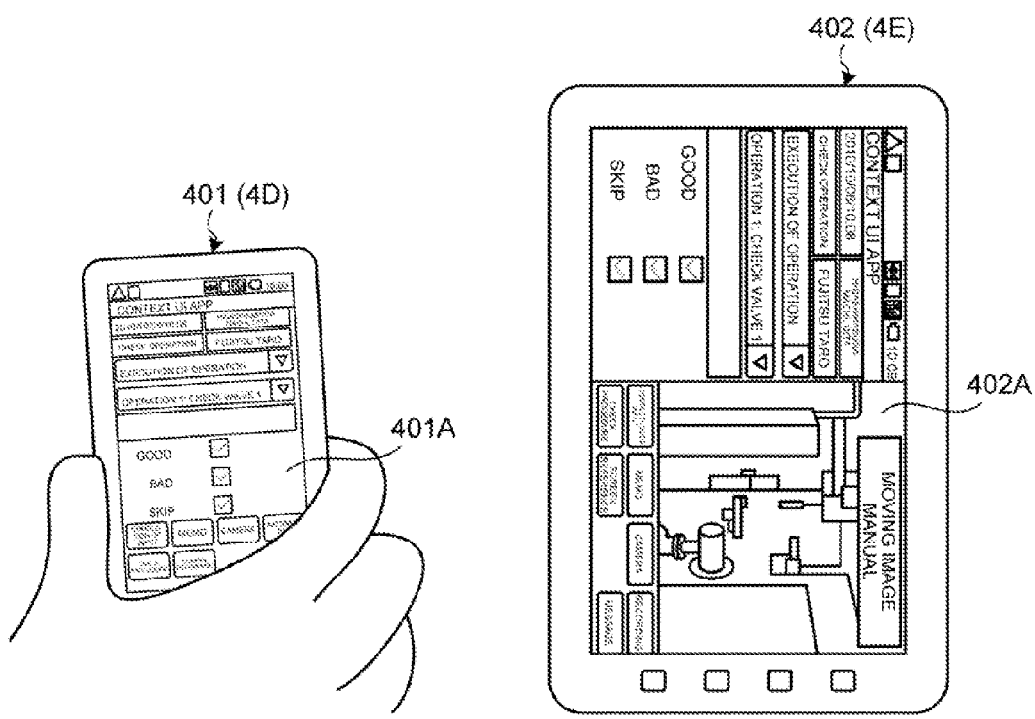
FIG. 13B is an explanatory diagram illustrating an example of coordinated operations of a source communication terminal and a destination communication terminal.

FIGS. 13A and 13B are an explanatory diagram illustrating an example of coordinated operations of the source communication terminal 4D and the destination communication terminal 4E. In the example illustrated in FIGS. 13A and 13B, the source communication terminal 4D is a mobile device 401, and the destination communication terminal 4E is a tablet terminal 402. The mobile device 401 illustrated in FIG. 13A executes a Web app, and displays an execution screen of the Web app on a display unit 401A. Then, in accordance with an app move operation made on the mobile device 401 to move the Web app to the tablet terminal 402, the RFID reader/writer 39A of the mobile device 401 acquires a tag ID of the tablet terminal 402. Furthermore, the mobile device 401 transmits move event information including the acquired tag ID, a storage location address of a resource of the Web app being executed by the mobile device 401, a move event, and a command to download and execute the Web app to the push server 2.

Upon receipt of the move event information, the address managing unit 13 of the push server 2 updates the providing timing associated with a terminal ID in the address management table 151 to "immediate" on the basis of the tag ID, the move event, the storage location address, and the command which are included in the move event information. Furthermore, the address managing unit 13 updates a command associated with the terminal ID in the address management table 151 to the obtained command.

As the providing timing is "immediate", the address managing unit 13 of the push server 2 identifies a terminal ID, a storage location address, and a command which correspond to the providing timing from the address management table 151. The push transmitting unit 15 of the push server 2 pushes the storage location address and the command to the tablet terminal 402 having the terminal ID. Then, the tablet terminal 402 acquires the Web app being executed by the mobile device 401 from the Web server 3 on the basis of the storage location address, and executes the acquired Web app on the basis of the command and displays the execution screen of the Web app on a display unit 402A. As a result, in accordance with the app move operation, the tablet terminal 402 can execute the same Web app as the mobile device 401 as illustrated in FIG. 13A.

Furthermore, when a user passes the mobile device 401 over the tablet terminal 402 displaying a video on the display unit 402A as illustrated in FIG. 13B, display content being displayed on the display unit 401A of the mobile device 401 is displayed on the screen of the display unit 402A of the tablet terminal 402. In this case, the display unit 402A includes a near field communication reader unit, and has a function to perform near field communication with an RFID tag when the RFID tag is passed over the display unit 402A. At this time, the display unit 402A of the tablet terminal 402 can be divided into two screens: one displays the video in use, and the other displays the display screen of the display unit 401A of the mobile device 401.

Incidentally, in the above third embodiment, for convenience of explanation, there is described the example where the RFID reader/writer 39A is built into the source communication terminal 4D and the RFID tag 39B is embedded in the destination communication terminal 4E. However, the communication terminals 4 (4D, 4E) can include both the RFID reader/writer 39A and the RFID tag 39B.

Furthermore, in the above third embodiment, the RFID communication function is used in the app move operation between the communication terminals 4; alternatively, near field communication (NFC) between the communication terminals 4 and a contact sensor system using a contact sensor for detecting contact between the communication terminals 4 can be employed.

[d] Fourth Embodiment

Figure 14:
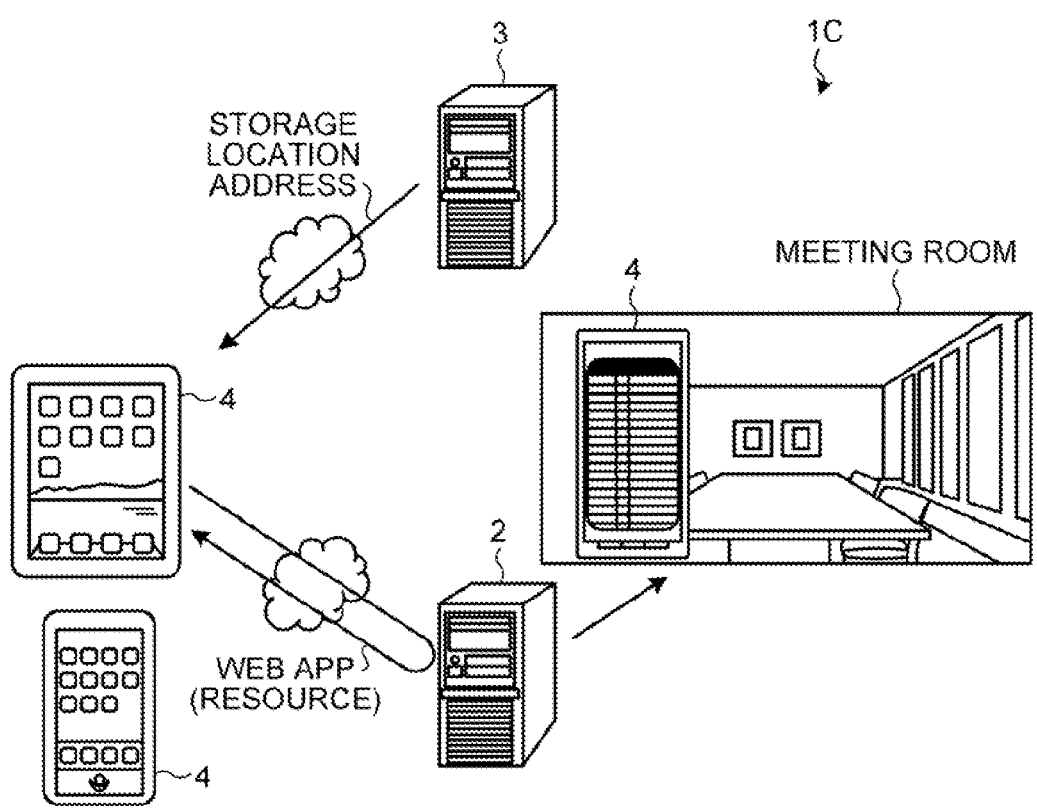
FIG. 14 is an explanatory diagram illustrating an example of usage of a Web-app providing system according to a fourth embodiment.

FIG. 14 is an explanatory diagram illustrating an example of usage of a Web-app providing system according to a fourth embodiment. Incidentally, components identical to those in the Web-app providing system 1B according to the third embodiment are denoted by the same reference numerals, and explanation of the configurations and operations of those components is omitted. A Web-app providing system 1C illustrated in FIG. 14 is assumed to be, for example, a Web-app providing system used in a meeting room.

It is assumed that providing timing 151E associated with a terminal ID 151B of a communication terminal 4 in the address managing unit 13 is the entry timing at which an owner of the communication terminal 4 enters the meeting room, and a command 151G is to download and execute a Web app. Incidentally, the entry timing is, for example, the timing at which entry of the owner of the communication terminal 4 into the meeting room is detected by communication between an entry monitoring device and the communication terminal 4 which is established by the entry of the communication terminal 4 into a communication range of the entry monitoring device installed at the entrance of the meeting room. The Web app is a presentation material browsing Web app. The command is to download and execute the presentation material browsing Web app.

Furthermore, it is assumed that providing timing 151E associated with identification information of a communication terminal 4 in the address managing unit 13 is the exit timing at which an owner of the communication terminal 4 leaves the meeting room, and a command 151G is to erase a Web app. Incidentally, the exit timing is the timing at which exit of the owner of the communication terminal 4 from the meeting room is detected by communication between the entry monitoring device and the communication terminal 4 which is established by re-entry of the communication terminal 4 into the communication range of the entry monitoring device. The Web app is a presentation material browsing Web app. The command is to erase the presentation material browsing Web app.

Upon detection of the entry timing of a communication terminal 4 into the meeting room, the address managing unit 13 of the push server 2 identifies a terminal ID 151B of the communication terminal 4, a storage location address 151D, and a command 151G from the address management table 151. Then, the push transmitting unit 15 of the push server 2 transmits the identified storage location address and command to the communication terminal 4. Then, the communication terminal 4 in the meeting room acquires a resource of the presentation material browsing Web app from the Web server 3 on the basis of the storage location address, and caches the acquired resource. Then, the communication terminal 4 executes the presentation material browsing Web app on the basis of the command.

Furthermore, upon detection of the exit timing of the communication terminal 4 from the meeting room, the timing monitoring unit 14 of the push server 2 identifies a terminal ID 151B of the communication terminal 4, a storage location address 151D, and a command 151G from the address management table 151. Then, the push transmitting unit 15 of the push server 2 transmits the identified storage location address and command to the communication terminal 4. Then, the communication terminal 4 outside of the meeting room identifies the presentation material browsing Web app on the basis of the storage location address, and erases the identified Web app from the cache on the basis of the command.

In the fourth embodiment, when a user of a communication terminal 4 enters the meeting room, the push server 2 determines that it is the providing timing, and provides a storage location address of the presentation material browsing Web app and a command to the communication terminal 4. Then, the communication terminal 4 in the meeting room acquires a resource relating to the presentation material browsing Web app on the basis of the storage location address, and caches the acquired resource, and then executes the presentation material browsing Web app on the basis of the command.

Furthermore, in the fourth embodiment, when the user of the communication terminal 4 leaves the meeting room, the push server 2 determines that it is the providing timing, and provides a storage location address of the presentation material browsing Web app and a command to the communication terminal 4. Then, the communication terminal 4 outside of the meeting room identifies a resource relating to the presentation material browsing Web app on the basis of the storage location address, and erases the presentation material browsing Web app from the cache on the basis of the command. As a result, the user of the communication terminal 4 cannot browse the presentation material browsing Web app after leaving the meeting room, and therefore, it is possible to ensure the confidentiality of the presentation material.

[e] Fifth Embodiment

Figure 15:
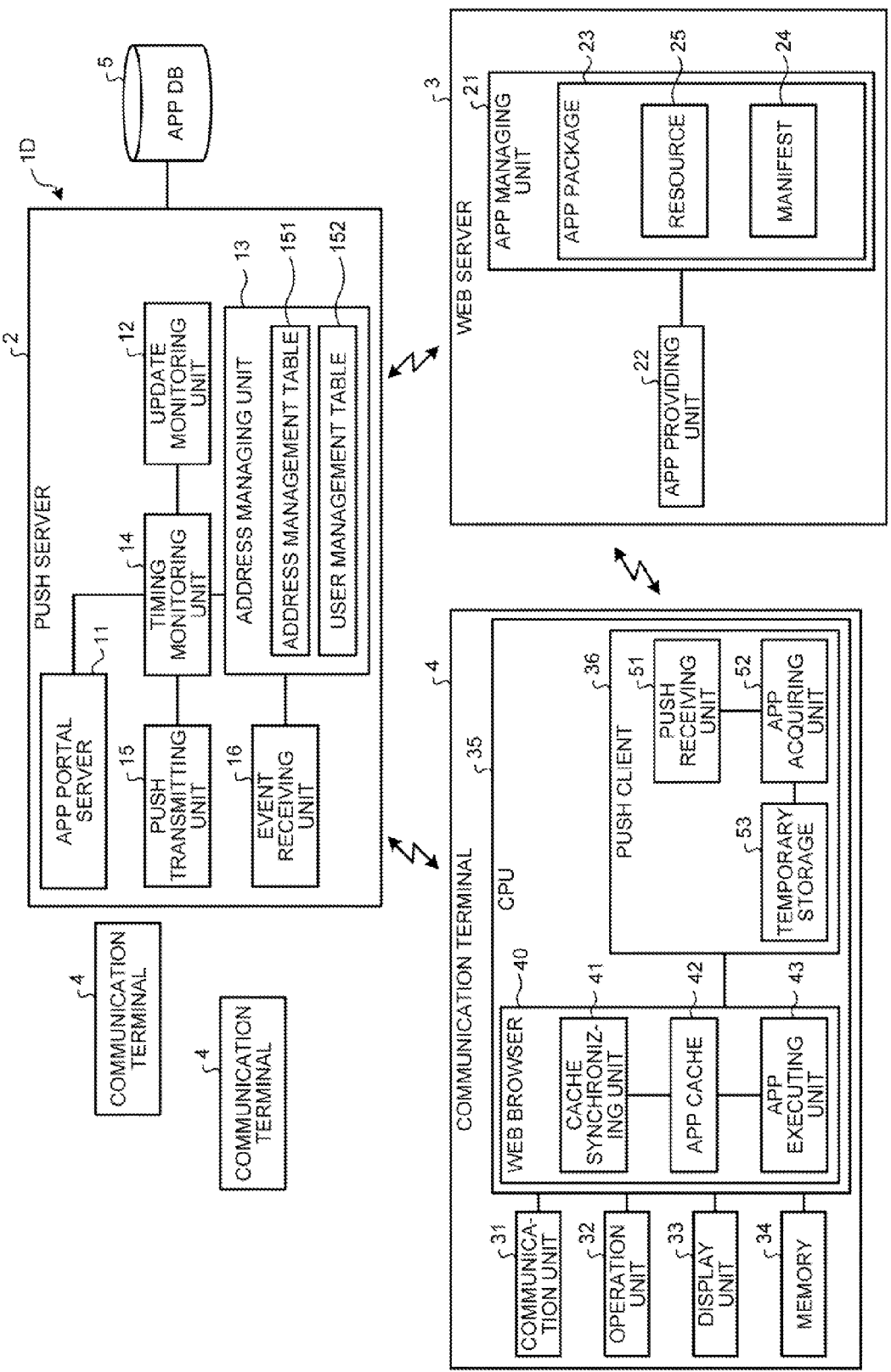
FIG. 15 is a functional block diagram illustrating an example of internals of a Web-app providing system according to a fifth embodiment.

FIG. 15 is a functional block diagram illustrating an example of internals of a Web-app providing system according to a fifth embodiment. Incidentally, components identical to those in the Web-app providing system 1 illustrated in FIG. 1 are denoted by the same reference numerals, and explanation of the configurations and operations of those components is omitted. A Web-app providing system 1D illustrated in FIG. 15 differs from the Web-app providing system 1 illustrated in FIG. 1 in that upon detection of a request for transmission of a specified Web app to a user, the Web-app providing system 1D provides the specified Web app to a particular communication terminal 4 likely to be currently in use by the user out of a plurality of communication terminals 4 that the user owns.

The push server 2 illustrated in FIG. 15 has the event receiving unit 16 in addition to the app portal server 11, the update monitoring unit 12, the address managing unit 13, the timing monitoring unit 14, and the push transmitting unit 15. The event receiving unit 16 receives event information from a communication terminal 4. Incidentally, the event information includes, for example, a user ID, a storage location address, event content, and a command. Incidentally, the user ID is an ID of a user to be provided with a Web app to be provided. The storage location address is a storage location of a resource relating to a Web app to be provided. The event content is an event based on a request for transmission (provision) of a Web app. The command is execution content of a Web app to be provided.

Figure 16:
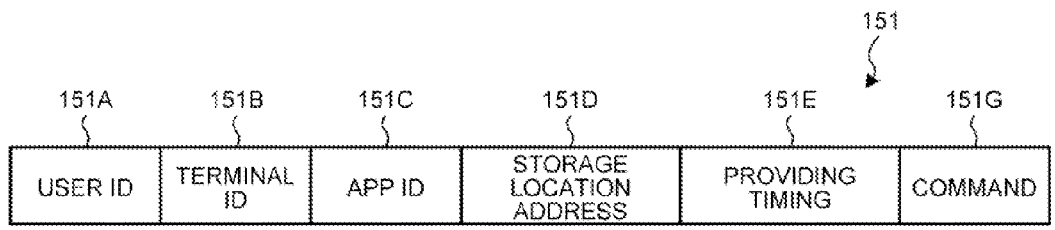
FIG. 16 is an explanatory diagram illustrating an example of contents of an address management table.

The address managing unit 13 manages the address management table 151 and a user management table 152, and dynamically updates/registers contents of the address management table 151 and the user management table 152. Furthermore, the address managing unit 13 makes various determinations with reference to the contents of the address management table 151 and the user management table 152. FIG. 16 is an explanatory diagram illustrating an example of contents of the address management table 151. The address management table 151 illustrated in FIG. 16 manages a command 151G in addition to a user ID 151A, a terminal ID 151B, an app ID 151C, a storage location address 151D, and providing timing 151E in a manner associated with one another. The command 151G is execution content of a Web app identified by the storage location address 151D.

Figure 17:
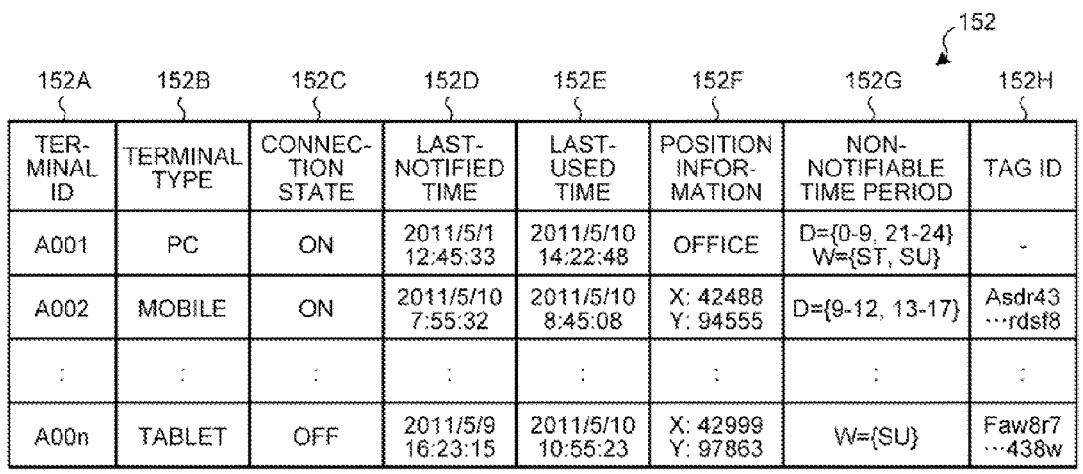
FIG. 17 is an explanatory diagram illustrating an example of contents of a user management table.

FIG. 17 is an explanatory diagram illustrating an example of contents of the user management table 152. The user management table 152 illustrated in FIG. 17 manages a management list of communication terminals 4 owned by each user. The management list associates a terminal ID 152A, a terminal type 152B, a connection status 152C, a last-notified time 152D, a last-used time 152E, position information 152F, a non-notifiable time period 152G, and a tag ID 152H with one another. Terminal ID 152A is an ID for identifying a communication terminal 4. The terminal type 152B is a type of communication terminal 4, such as a PC, a mobile device, or a tablet terminal. The connection status 152C indicates whether a communication terminal 4 is in a fit state to communicate with the push server 2. When the connection status 152C is "ON", the communication terminal 4 is in a fit state to communicate with the push server 2. On the other hand, when the connection status 152C is "OFF", the communication terminal 4 is not in a fit state to communicate with the push server 2.

Furthermore, the address managing unit 13 manages an attribute information table (not illustrated) in which attribute information of each Web app is stored, and recognizes a terminal type and location corresponding to each Web app and a storage location address of a resource relating to the Web app with reference to the attribute information table.

The last-notified time 152D is date and time of the last time the push server 2 communicated with a communication terminal 4. The last-used time 152E is date and time of the last time a user used a communication terminal 4. Incidentally, the last-used time 152E is determined on the basis of information from sensors installed in devices in a communication terminal 4 and an exterior sensor in addition to detection of a network status. For example, when a communication terminal 4 is a PC, the push server 2 detects input by keyboard of the PC, and sets a time of the detection as a last-used time. Furthermore, for example, when a communication terminal 4 is a mobile device, the push server 2 collects information from a vibration sensor and an acceleration sensor, etc. in the mobile device, and sets a time when the mobile device was used as a last-used time on the basis of the collected information. Incidentally, a method to determine a last-used time can be arbitrarily changed.

The position information 152F is position information, such as positional coordinates or a name of place, acquired by a global positioning system (GPS) function or communication module of a communication terminal 4. The non-notifiable time period 152G is a user-established period of time in which information on a Web app is not notified. Incidentally, "D={0-9, 21-24}, W={ST, SU}" in FIG. 17 represents "communication is not available every day from 0 to 9 o'clock and 21 to 24 o'clock, and communication is not available all day on Saturdays and Sundays". The tag ID 152H is an ID for identifying an RFID tag embedded in a communication terminal 4.

Figure 18:
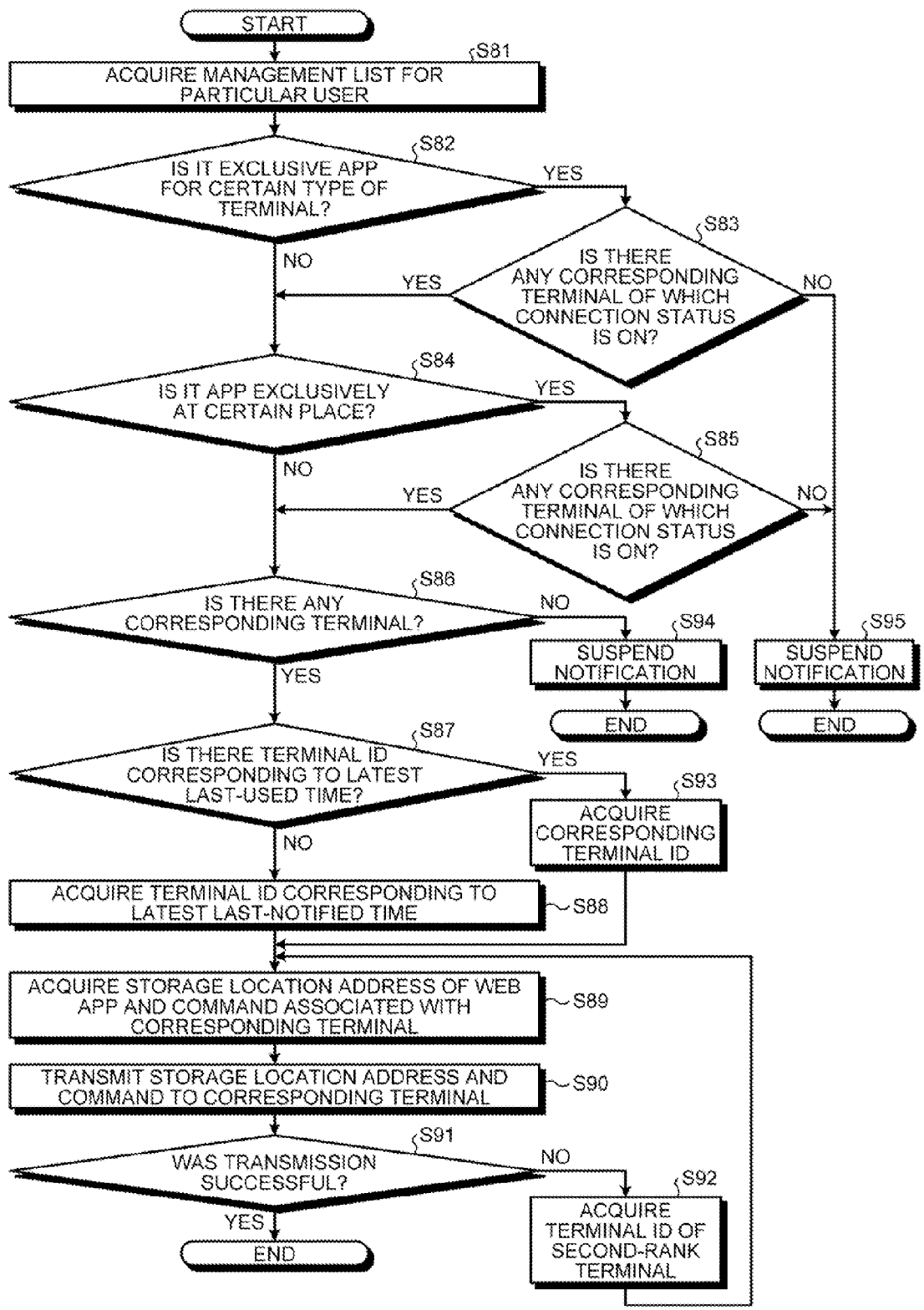
FIG. 18 is a flowchart illustrating an example of a processing operation of the push server involved in a user-specified address providing process.

Subsequently, the operation of the Web-app providing system ID according to the fifth embodiment is explained. FIG. 18 is a flowchart illustrating an example of a processing operation of the push server 2 involved in a user-specified address providing process. The address providing process illustrated in FIG. 18 is a process that upon detection of a request for transmission of a Web app to a user, a storage location address of a resource of the Web app and a command are provided to a communication terminal 4 likely to be currently in use by the user out of a plurality of communication terminals 4 that the user owns.

In FIG. 18, upon receipt of a request for transmission of a Web app to a particular user, the address managing unit 13 of the push server 2 acquires a management list for the particular user from the user management table 152 (Step S81). When acquired the management list for the particular user, the address managing unit 13 determines whether the specified Web app is an app exclusively for a certain type of terminal on the basis of a terminal type 152B in the management list and attribute information of the Web app in the attribute information table (Step S82). Incidentally, an app exclusively for a certain type of terminal is a Web app that can be executed by a particular type of communication terminal 4 only.

When the specified Web app is an app exclusively for a certain type of terminal (YES at Step S82), the address managing unit 13 determines whether there is any corresponding communication terminal 4 of which the connection status is ON with reference to connection statuses 152C in the management list (Step S83). When there is a corresponding communication terminal 4 of which the connection status is ON (YES at Step S83), the address managing unit 13 determines that the communication terminal 4 can execute the specified Web app. Furthermore, the address managing unit 13 determines whether the specified Web app is an app exclusively at a certain place on the basis of position information 152F in the management list and the attribute information of the Web app in the attribute information table (Step S84). Incidentally, an app exclusively at a certain place is a Web app allowed to be executed at a particular place only. When the specified Web app is an app exclusively at a certain place (YES at Step S84), the address managing unit 13 determines whether there is any corresponding communication terminal 4 of which the connection status is ON with reference to connection statuses 152C in the management list (Step S85).

When there is a corresponding communication terminal 4 of which the connection status is ON (YES at Step S85), the address managing unit 13 determines that the communication terminal 4 is at the place where the specified Web app can be executed. The address managing unit 13 further determines whether there is any corresponding communication terminal 4 to be provided with the specified Web app (Step S86). Incidentally, the corresponding communication terminal 4 can include, for example, a communication terminal 4 that clears the condition of the non-notifiable time period 152G and can execute the specified Web app. When there is a corresponding communication terminal 4 (YES at Step S86), the address managing unit 13 determines whether there is a terminal ID of a communication terminal 4 corresponding to the latest last-used time in terminal IDs of the corresponding communication terminals 4 with reference to last-used times 152E in the management list (Step S87).

When there is no terminal ID corresponding to the latest last-used time (NO at Step S87), the address managing unit 13 acquires a terminal ID corresponding to the latest last-notified time in the terminal IDs of the corresponding communication terminals 4 with reference to last-notified times 152D in the management list (Step S88). When acquired the terminal ID corresponding to the latest last-notified time, the address managing unit 13 acquires a storage location address relating to the Web app and a command which are associated with the terminal ID from the address management table 151 (Step S89).

After the storage location address relating to the Web app and the command which are associated with the terminal ID are acquired, the push transmitting unit 15 transmits the storage location address and the command to a communication terminal 4 corresponding to the terminal ID (Step S90). The push transmitting unit 15 determines whether the transmission of the storage location address and the command at Step S90 was successful (Step S91). When the push transmitting unit 15 succeeded in transmitting the storage location address and the command (YES at Step S91), the processing operation illustrated in FIG. 18 is terminated.

On the other hand, when the transmission of the storage location address and the command was not successful (NO at Step S91), the address managing unit 13 acquires a terminal ID corresponding to the second latest last-used time or the second latest last-notified time in the terminal IDs of the corresponding communication terminals 4 (Step S92). Then, move on to Step S89, the address managing unit 13 acquires a storage location address and a command which are associated with the terminal ID.

Furthermore, when there is a terminal ID corresponding to the latest last-used time (YES at Step S87), the address managing unit 13 acquires the terminal ID from the address management table 151 (Step S93). Then, move on to Step S89, the address managing unit 13 acquires a storage location address and a command which are associated with the terminal ID.

Furthermore, when there is no corresponding communication terminal 4 (NO at Step S86), the address managing unit 13 suspends the transmission of the storage location address relating to the Web app and the command (Step S94), and the processing operation illustrated in FIG. 18 is terminated. Incidentally, in the case of suspension, when the connection status of the corresponding communication terminal 4 is ON, the push transmitting unit 15 retransmits the storage location address relating to the Web app and the command to the communication terminal 4. Furthermore, when the specified Web app is not an app exclusively for a certain type of terminal (NO at Step S82), move on to Step S84, the address managing unit 13 determines whether the specified Web app is an app exclusively at a certain place.

Furthermore, when there is no corresponding communication terminal 4 of which the connection status is ON (NO at Step S83, NO at Step S85), the address managing unit 13 suspends the transmission of the storage location address relating to the Web app and the command (Step S95), and the processing operation illustrated in FIG. 18 is terminated. Incidentally, in the case of suspension, when the connection status of the corresponding communication terminal 4 is ON, the push transmitting unit 15 retransmits the storage location address relating to the Web app and the command to the communication terminal 4.

In the process illustrated in FIG. 18, upon receipt of a request for transmission of a specified Web app to a user, the push server 2 acquires a terminal ID of a communication terminal 4 that can apply to the specified Web app and is likely to be currently in use out of a plurality of communication terminals 4 that the designated user owns. Then, the push server 2 transmits a storage location address relating to the specified Web app and a command to the communication terminal 4 having the acquired terminal ID. As a result, the push server 2 can notify the storage location address relating to the specified Web app and the command to the communication terminal 4 likely to be currently in use by the user out of the plurality of communication terminals 4 that the designated user owns.

Furthermore, the push server 2 transmits a storage location address relating to a specified Web app and a command to a communication terminal 4 that corresponds to the app exclusively for a certain type of terminal and is likely to be currently in use out of a plurality of communication terminals 4 that a designated user owns. The push server 2 can avoid such a situation that when a communication terminal 4 likely to be currently in use is a PC, the push server 2 transmits a storage location address of an app exclusively for a mobile device only to the PC in spite of the app exclusively for a mobile device only.

Moreover, the push server 2 transmits a storage location address relating to a specified Web app and a command to a communication terminal 4 that corresponds to the app exclusively at a certain place and is likely to be currently in use out of a plurality of communication terminals 4 that a designated user owns. The push server 2 can avoid such a situation that when a communication terminal 4 likely to be currently in use is a household PC outside the office, the push server 2 transmits a storage location address of a confidential-document browsing app to the household PC in spite of the confidential-document browsing Web app exclusively at the office.

Then, upon receipt of the storage location address and the command from the push server 2, the communication terminal 4 acquires a resource of the specified Web app from the Web server 3 on the basis of the storage location address, and executes the acquired Web app on the basis of the command.

In the fifth embodiment, upon receipt of a request for transmission of a specified Web app to a user, the push server 2 acquires a terminal ID of a communication terminal 4 that corresponds to the specified Web exclusively for a certain type of terminal and exclusively at a certain place and is likely to be currently in use out of a plurality of communication terminals 4 that the designated user owns. Then, the push server 2 transmits a storage location address of the specified Web app and a command to the communication terminal 4 having the acquired terminal ID. As a result, the push server 2 can notify the storage location address relating to the specified Web app and the command to the communication terminal 4 likely to be currently in use by the user out of the plurality of communication terminals 4 that the designated user owns.

For example, in the case of business operation for a travel authorization request, the supervisor approves the travel authorization request from a subordinate using a business application on his/her communication terminal 4, such as his/her company PC, in general. However, when the supervisor is out of the office without carrying his/her company PC, the supervisor cannot do the operation. In this case, the subordinate transmits a request for transmission of the business-trip approval Web app to the supervisor as a destination to the push server 2. Upon receipt of the request for transmission, the push server 2 acquires a terminal ID of a communication terminal 4 likely to be currently in use out of a plurality of communication terminals 4 that the supervisor owns, i.e., a communication terminal 4 that the supervisor carries outside the office. Then, the push server 2 transmits a storage location address of the business-trip approval Web app and a command to the communication terminal 4 having the acquired terminal ID. Then, the communication terminal 4 acquires a resource of the business-trip approval Web app from the Web server 3 on the basis of the storage location address, and executes the acquired business-trip approval Web app on the basis of the command. As a result, the supervisor can approve the travel authorization request using the business-trip approval Web app on the communication terminal 4 that he/she carries outside the office.

Incidentally, in the above fifth embodiment, a storage location address of a specified Web app and a command are transmitted to a communication terminal 4 that clears all conditions of an app exclusively for a certain type of terminal, an app exclusively at a certain place, a connection status, a last-notified time, a last-used time, and a non-notifiable time period. However, the push transmitting unit 15 can be configured to transmit the storage location address of the specified Web app and the command to even a communication terminal 4 that clears some of the conditions, and the conditions can be arbitrarily selected and changed.

Furthermore, in the above fifth embodiment, upon receipt of a request for transmission of a specified Web app to a user, the push server 2 transmits a storage location address and a command to a communication terminal 4 likely to be currently in use out of a plurality of communication terminals 4 that the designated user owns. However, the push server 2 does not limit the number of communication terminals 4 likely to be currently in use to one, and the number of communication terminals 4 likely to be currently in use can be two or more. Furthermore, the push server 2 transmits the storage location address and the command to the communication terminal 4 likely to be currently in use; however, the push server 2 can transmit the storage location address and the command to all the communication terminals 4 that the user owns.

Moreover, the components of the units illustrated in the drawings do not always have to be physically configured as illustrated in the drawings. Namely, specific forms of distribution and integration of the units are not limited to those illustrated in the drawings, and all or part of the units can be configured to be functionally or physically distributed or integrated in arbitrary units depending on respective loads or usages, etc.

Furthermore, all or arbitrary part of processing functions performed in each device can be executed on a central processing unit (CPU) (or a microcomputer, such as a micro processing unit (MPU) or a micro controller unit (MCU)). Moreover, it is obvious that all or arbitrary part of the processing functions can be executed on a program causing the PCU (or the microcomputer, such as an MPU or an MCU) to analyze and execute the processing functions or on hardware using wired logic.

Figure 19:
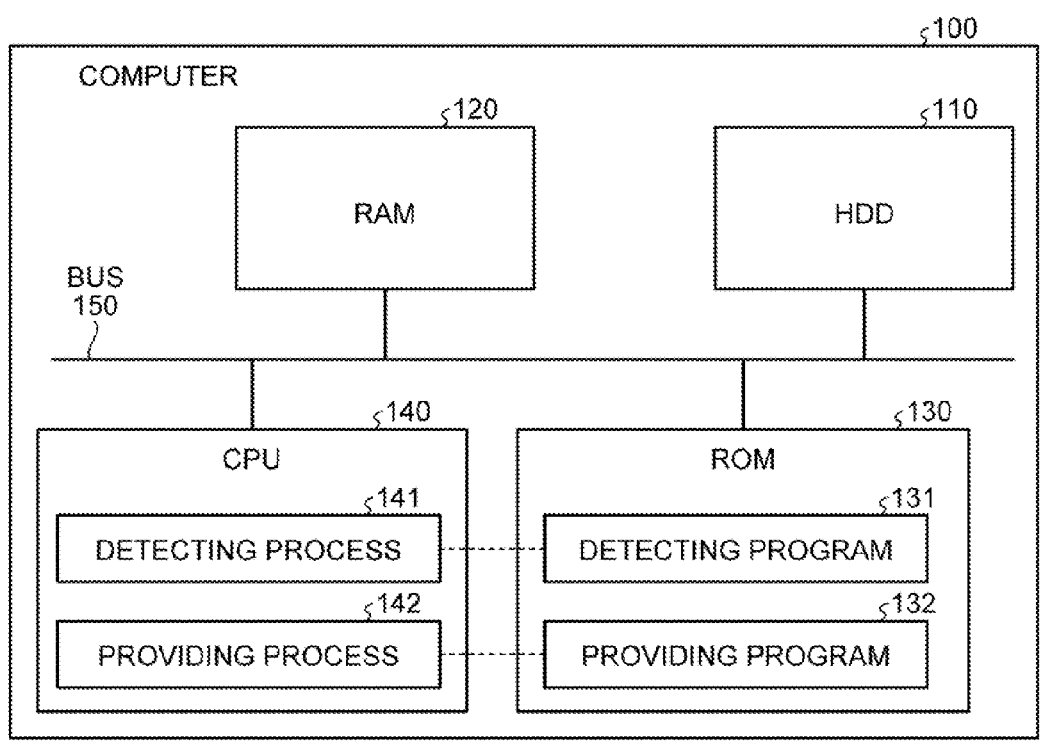
FIG. 19 is an explanatory diagram illustrating a computer that executes an information processing program.

The various processes explained in the present embodiments can be realized by causing a computer to execute a program prepared in advance. An example of the computer that executes a program having the same functions as those described in the above embodiments is explained below with reference to FIG. 19. FIG. 19 is an explanatory diagram illustrating a computer that executes an information processing program.

As illustrated in FIG. 19, in a computer 100 as an information processing program, a hard disk drive (HDD) 110, a random access memory (RAM) 120, a read-only memory (ROM) 130, and a CPU 140 are connected to one another via a bus 150.

In the ROM 130 or the HDD 110, the information processing program that fulfills the same functions as those described in the above embodiments is stored in advance. Incidentally, the information processing program can be recorded on a computer-readable recording medium that is driven by a drive (not illustrated) instead of storing the information processing program in the ROM 130 or the HDD 110. The recording medium can be a portable recording medium, such as a CD-ROM, a DVD, or a USB memory, and a semiconductor memory, such as a flash memory, etc. The information processing program is, as illustrated in FIG. 19, a detecting program 131 and a providing program 132. Incidentally, the programs 131 and 132 can be arbitrarily integrated or decentralized in the same manner as the components of the push server illustrated in FIG. 1.

The CPU 140 reads out these programs 131 and 132 from the ROM 130, and executes the programs 131 and 132. Then, as illustrated in FIG. 19, the programs 131 and 132 serve as a detecting process 141 and a providing process 142, respectively.

The RAM 120 manages a terminal ID for identifying a communication terminal 4, a storage location address of a resource of a Web app to be provided to the communication terminal 4, and providing timing to provide the Web app to the communication terminal 4 in a manner associated with one another. The CPU 140 detects the providing timing managed in the RAM 120. Upon detection of the providing timing, the CPU 140 provides a storage location address of a resource of a Web app associated with the providing timing to a communication terminal 4 associated with the providing timing via a communication unit (not illustrated). As a result, a user of the communication terminal 4 can automatically obtain a necessary Web app when needed in accordance with the providing timing without performing a request operation for acquisition of an app.

A system discussed herein can automatically provide a resource of a Web app to a client.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An application providing system comprising:
communication devices; and
an address management device that manages a storage location address of resource information of a Web application, wherein
the address management device includes:
an address managing unit that manages identification information for identifying the communication device, a storage location address of resource information relating to a Web application to be provided to the communication device, providing timing to provide the Web application to the communication device, and a command relating to the Web application in a manner associated with one another;
a timing monitoring unit that monitors whether the current timing is providing timing; and
a providing unit that provides the storage location address of resource information and the command relating to a Web application associated with providing timing to the communication device associated with the providing timing when the timing monitoring unit determines that the current timing is the providing timing, and
the communication device includes:
a requesting unit that issues an application request for resource information of a Web application on the basis of the storage location address upon receipt of the storage location address from the address management device;
a temporary storage that temporarily stores therein the resource information of the Web application provided in response to the application request;
a cache synchronizing unit that synchronizes the resource information stored in the temporary storage to a cache of a Web browser; and
an application executing unit that can execute the Web application on the basis of the command of the resource information stored in the cache.

2. The application providing system according to claim 1, wherein
upon receipt of a request for transmission of a Web application to the communication device, the address managing unit manages providing timing to immediately provide the storage location address of resource information relating to the requested Web application to the communication device in a manner associated with the identification information of the communication device and the storage location address.

3. The application providing system according to claim 1, wherein
the address managing unit further manages owner identifying information for identifying an owner of a communication device in a manner associated with the identification information, the storage location address, and the providing timing, and
upon receipt of a request for transmission of a Web application to a particular owner's communication device, the timing monitoring unit identifies identification information meeting a predetermined condition out of multiple pieces of identification information associated with owner identifying information for identifying the particular owner, and monitors whether the current timing is providing timing associated with the identified identification information.

4. An application providing method of an application providing system including communication devices and an address management device that manages a storage location address of resource information of a Web application, the application providing method comprising:
causing the address management device to monitor whether the current timing is providing timing with reference to an address managing unit that manages identification information for identifying the communication device, a storage location address of resource information relating to a Web application to be provided to the communication device, providing timing to provide the Web application to the communication device, and a command relating to the Web application in a manner associated with one another, and provide the storage location address of resource information and the command relating to the Web application associated with providing timing to the communication device associated with the providing timing when the current timing is the providing timing; and
causing the communication device to issue an application request for resource information of the Web application on the basis of the storage location address upon receipt of the storage location address from the address management device, and temporarily store the resource information of the Web application provided in response to the application request, and synchronize the stored resource information to a cache of a Web browser, and then execute the Web application on the basis of the command of the cached resource information of the Web application.

5. An information processing apparatus comprising:
an address managing unit that manages identification information for identifying a communication device, a storage location address of resource information of a Web application to be provided to the communication device, providing timing to provide the Web application to the communication device, and a command relating to the Web application in a manner associated with one another;
a timing monitoring unit that monitors whether the current timing is the providing timing; and
an address providing unit that provides the storage location address of resource information and the command relating to the Web application associated with providing timing to the communication device associated with the providing timing so as to provide the resource information to the communication device when the timing monitoring unit determines that the current timing is the providing timing.

* * * * *